(12) United States Patent
Kondo et al.

(10) Patent No.: US 12,162,128 B2
(45) Date of Patent: Dec. 10, 2024

(54) POWER TOOL

(71) Applicant: MAKITA CORPORATION, Anjo (JP)

(72) Inventors: Tomoyuki Kondo, Anjo (JP); Kiichi Kato, Anjo (JP)

(73) Assignee: MAKITA CORPORATION, Anjo (JP)

( * ) Notice: Subject to any disclaimer, the term of this patent is extended or adjusted under 35 U.S.C. 154(b) by 571 days.

(21) Appl. No.: 17/530,565

(22) Filed: Nov. 19, 2021

(65) Prior Publication Data

US 2022/0203512 A1    Jun. 30, 2022

(30) Foreign Application Priority Data

Dec. 24, 2020   (JP) ................. 2020-215583

(51) Int. Cl.
| | | |
|---|---|---|
| *B25F 5/00* | (2006.01) | |
| *H02K 7/00* | (2006.01) | |
| *H02K 7/08* | (2006.01) | |
| *H02K 7/116* | (2006.01) | |
| *H02K 7/14* | (2006.01) | |
| *H02K 21/14* | (2006.01) | |
| *B25B 21/02* | (2006.01) | |

(52) U.S. Cl.
CPC ............ *B25F 5/001* (2013.01); *H02K 7/003* (2013.01); *H02K 7/086* (2013.01); *H02K 7/116* (2013.01); *H02K 7/14* (2013.01); *H02K 21/14* (2013.01); *B25B 21/02* (2013.01)

(58) Field of Classification Search
CPC ...................................... B25F 5/001
See application file for complete search history.

(56) References Cited

U.S. PATENT DOCUMENTS

| | | | |
|---|---|---|---|
| 2015/0151447 A1 | 6/2015 | Petersson et al. | |
| 2020/0217412 A1 | 7/2020 | Nakashima | |
| 2023/0191565 A1* | 6/2023 | Kamiya | ................ B25B 21/02 |
| | | | 173/93 |

FOREIGN PATENT DOCUMENTS

| | | | | |
|---|---|---|---|---|
| CN | 114670158 A | * | 6/2022 | ............ B25F 5/001 |
| DE | 102020129856 A1 | * | 6/2021 | ............ B25B 21/02 |
| JP | 2009-044797 A | | 2/2009 | |
| JP | 2012-095476 A | | 5/2012 | |
| JP | 2016-096722 A | | 5/2016 | |

(Continued)

OTHER PUBLICATIONS

Jul. 16, 2024 Office Action issued in Japanese Patent Application No. 2020-215583.

*Primary Examiner* — Eyamindae C Jallow
(74) *Attorney, Agent, or Firm* — Oliff PLC

(57) ABSTRACT

A power tool reduces performance deterioration. The power tool includes a motor, an output unit, a motor compartment, and a grip. The motor includes a rotor bearing and a rotor rotatable about a rotation axis extending in a front-rear direction. The rotor includes a rotor magnet, a core to which the rotor magnet is fixed, and a shaft protruding from an end face of the core and supported by the rotor bearing. The shaft and the core together are a single member. The output unit is at least partially located frontward from the motor and rotatable by the rotor. The motor compartment accommodates at least a part of the motor. The grip protrudes downward from the motor compartment.

18 Claims, 21 Drawing Sheets

(56) References Cited

FOREIGN PATENT DOCUMENTS

| JP | 2020-110857 A | 7/2020 |
|----|---------------|--------|
| JP | 2020-124792 A | 8/2020 |

* cited by examiner

POWER TOOL

CROSS-REFERENCE TO RELATED APPLICATIONS

This application claims the benefit of priority to Japanese Patent Application No. 2020-215583, filed on Dec. 24, 2020, the entire contents of which are hereby incorporated by reference.

BACKGROUND

1. Technical Field

The present disclosure relates to a power tool.

2. Description of the Background

In the technical field of power tools, a power tool mechanism is known as described in Japanese Unexamined Patent Application Publication No. 2016-096722.

BRIEF SUMMARY

A power tool includes a motor as a power source. The motor includes a rotor including a rotor core and a rotor shaft fixed to the rotor core. As the rotor shaft rotates, an output unit in the power tool rotates.

With the rotor shaft press-fitted in and fixed to the rotor core, the rotor core and the rotor shaft may slip relative to each other during work using the power tool. Moreover, the center axis of the rotor core may not align with the center axis of the rotor shaft. In this case, power from the motor may not be properly transmitted to the output unit, lowering the performance of the power tool.

One or more aspects of the present disclosure are directed to a power tool that reduces performance deterioration.

A first aspect of the present disclosure provides a power tool, including:
  a motor including
    a rotor bearing, and
    a rotor rotatable about a rotation axis extending in a front-rear direction, the rotor including
      a rotor magnet,
      a core to which the rotor magnet is fixed, and
      a shaft protruding from an end face of the core and supported by the rotor bearing, the shaft and the core together being a single member;
an output unit at least partially located frontward from the motor and rotatable by the rotor;
  a motor compartment accommodating at least a part of the motor; and
  a grip protruding downward from the motor compartment.

A second aspect of the present disclosure provides a power tool, including:
  a brushless motor including
    a rotor including
      a rotor magnet,
      a core to which the rotor magnet is fixed, and
      a shaft protruding from an end face of the core in a front-rear direction, the shaft and the core together being a single member, and
    a stator including
      a stator core located radially outside the rotor, and
      a coil attached to the stator core;
  a pinion gear located on a front end of the shaft;
  a planetary gear meshing with the pinion gear;
  an internal gear meshing with the planetary gear;
  an output unit rotatable by the planetary gear;
  a hammer case accommodating the pinion gear, the planetary gear, and the internal gear;
  a motor compartment accommodating at least a part of the brushless motor; and
  a grip protruding downward from the motor compartment.

The power tool according to the above aspects of the present disclosure reduces performance deterioration.

DETAILED DESCRIPTION

Although one or more embodiments of the present disclosure will now be described with reference to the drawings, the present disclosure is not limited to the present embodiments. The components in the embodiments described below may be combined as appropriate. One or more components may be eliminated.

In the embodiments, the positional relationships between the components will be described using the directional terms such as right and left (or lateral), front and rear (or forward and backward), and up and down (or vertical). The terms indicate relative positions or directions with respect to the center of a power tool 1. The power tool 1 according to the embodiments is a rotating tool including a motor 6.

In the embodiments, a direction parallel to a rotation axis AX of the motor 6 is referred to as an axial direction for convenience. A direction about the rotation axis AX is referred to as a circumferential direction or circumferentially, or a rotation direction for convenience. A direction radial from the rotation axis AX is referred to as a radial direction or radially for convenience.

The rotation axis AX extends in a front-rear direction. The axial direction is from the front to the rear or from the rear to the front. A position nearer the rotation axis AX in the radial direction, or a radial direction toward the rotation axis AX, is referred to as radially inside or radially inward for convenience. A position farther from the rotation axis AX in the radial direction, or a radial direction away from the rotation axis AX, is referred to as radially outward for convenience.

Power Tool

Figure 1:
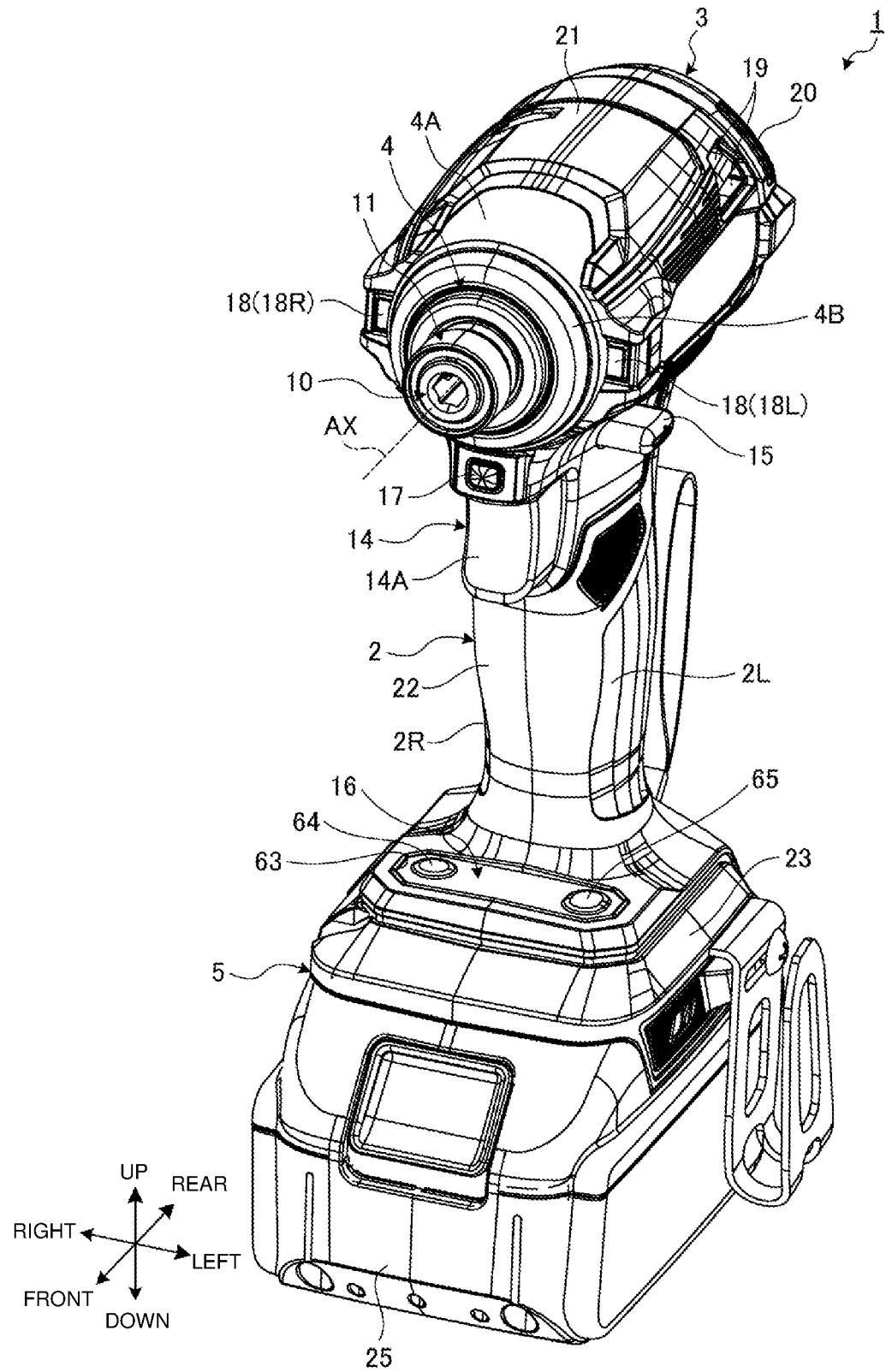
FIG. 1 is a perspective view of a power tool according to an embodiment.
Figure 2:
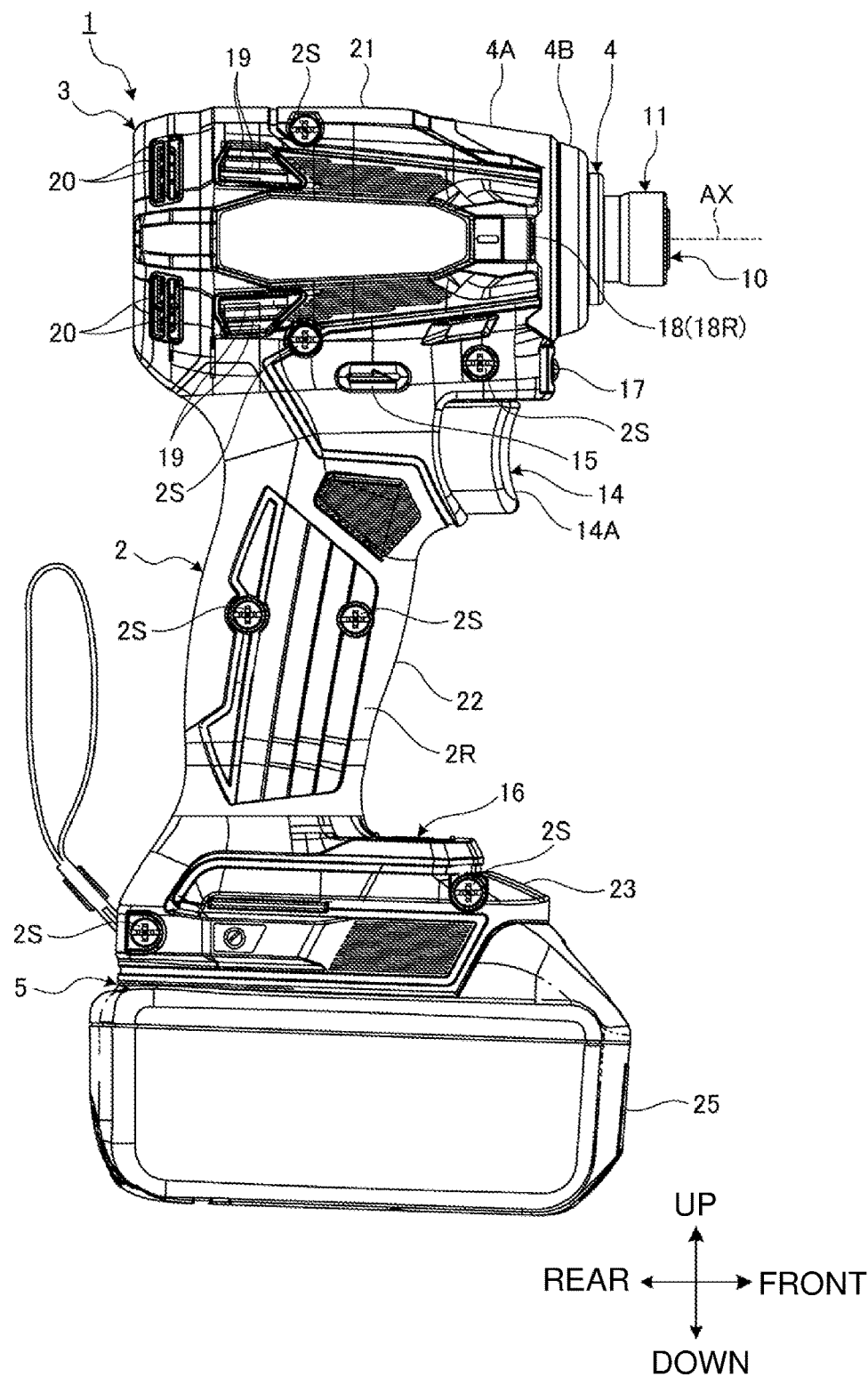
FIG. 2 is a side view of the power tool according to the embodiment.
Figure 3:
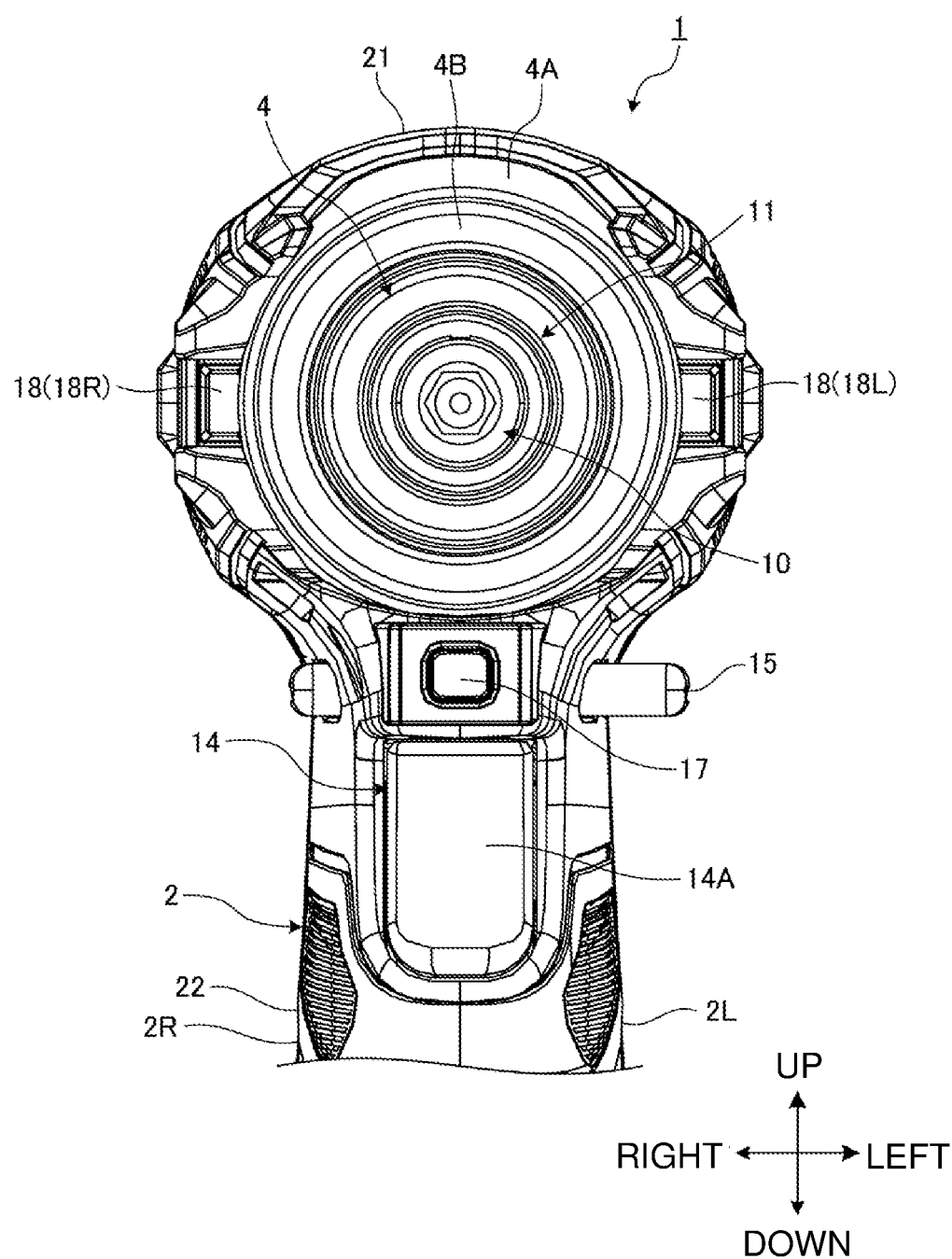
FIG. 3 is a front view of an upper portion of the power tool according to the embodiment.
Figure 4:
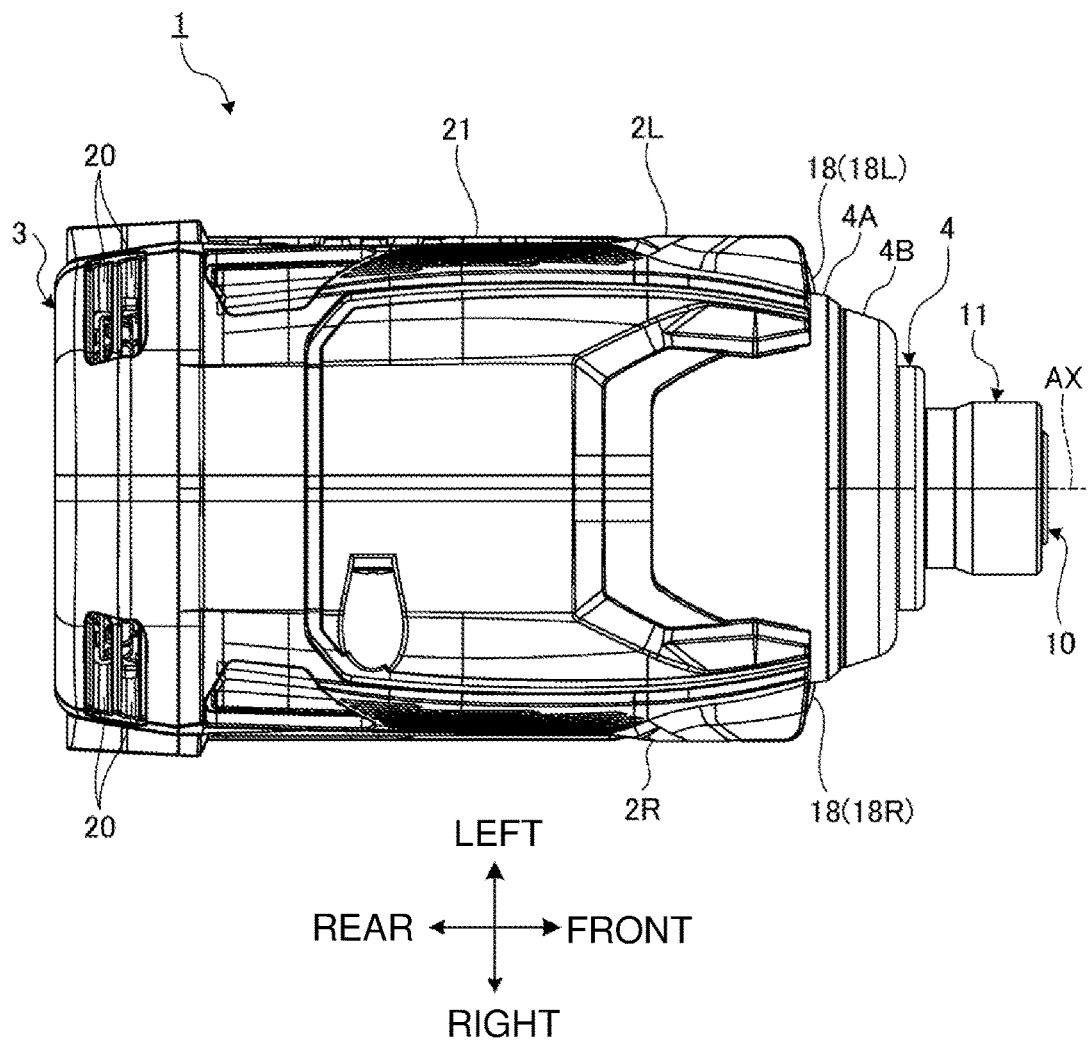
FIG. 4 is a plan view of the upper portion of the power tool according to the embodiment.
Figure 5:
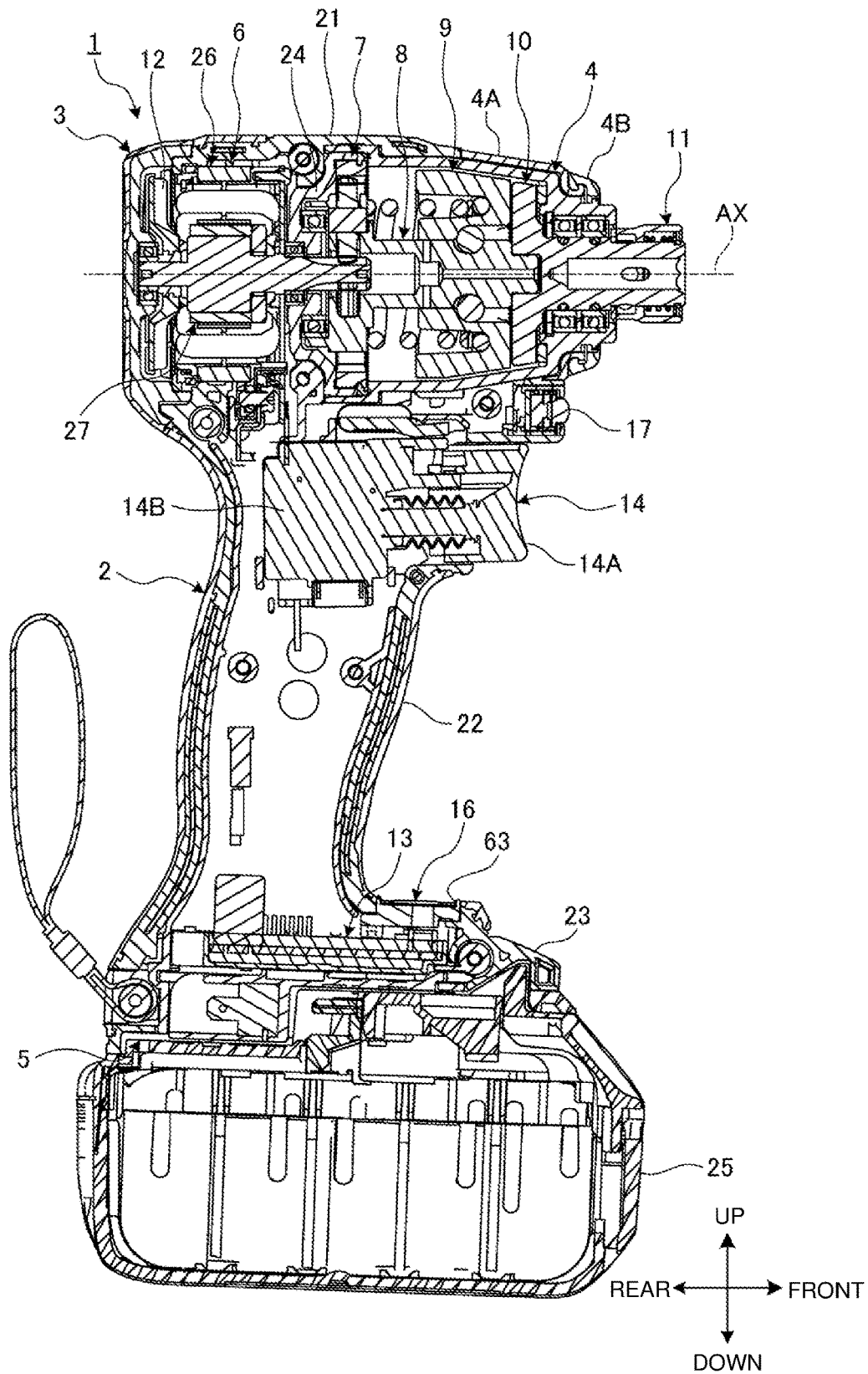
FIG. 5 is a longitudinal sectional view of the power tool according to the embodiment.
Figure 6:
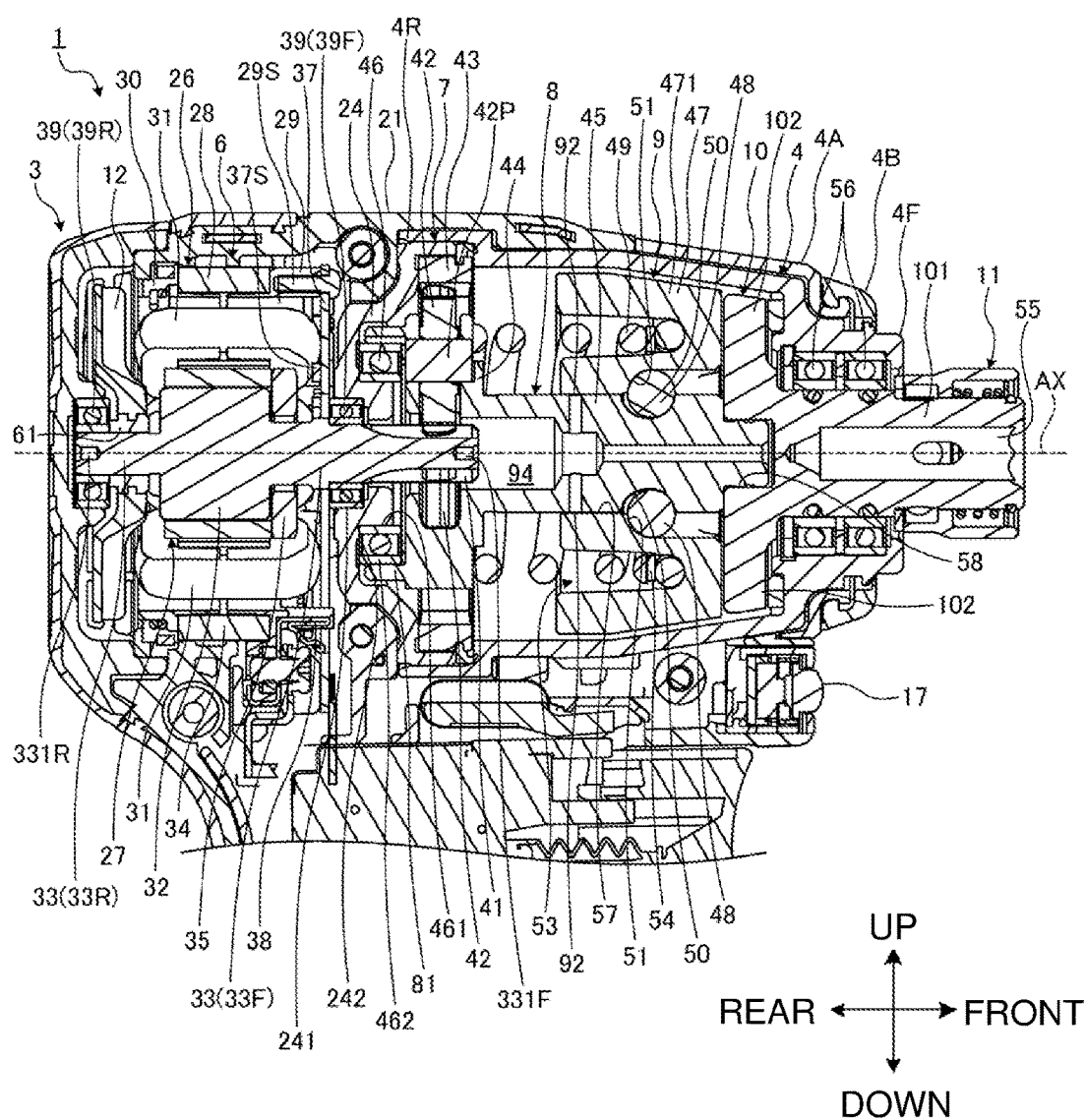
FIG. 6 is a longitudinal sectional view of the upper portion of the power tool according to the embodiment.
Figure 7:
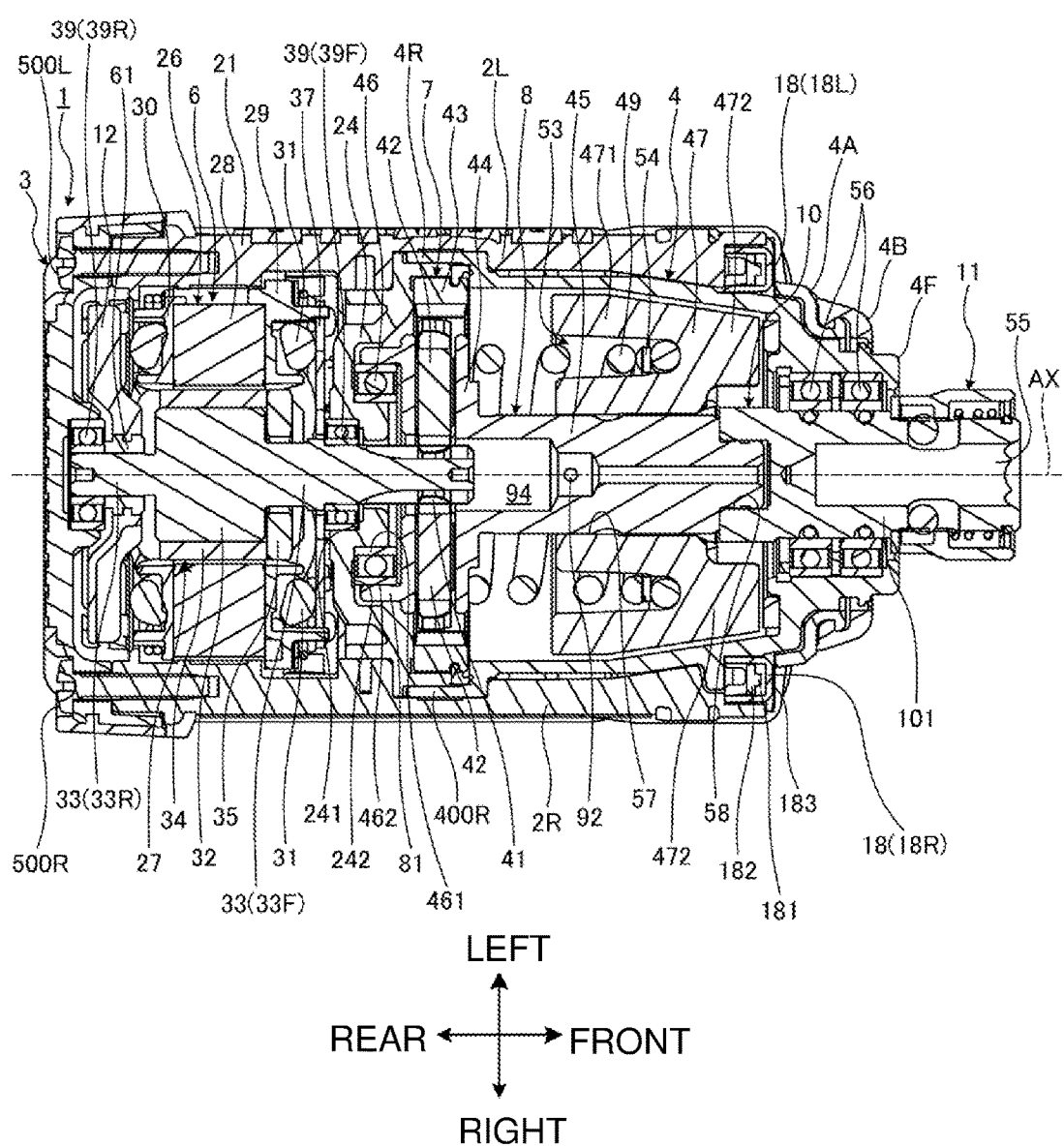
FIG. 7 is a transverse sectional view of the upper portion of the power tool according to the embodiment.

FIG. 1 is a perspective view of the power tool 1 according to the embodiment. FIG. 2 is a side view of the power tool 1 according to the embodiment. FIG. 3 is a front view of an upper portion of the power tool 1 according to the embodiment. FIG. 4 is a plan view of the upper portion of the power tool 1 according to the embodiment. FIG. 5 is a longitudinal sectional view of the power tool 1 according to the embodiment. FIG. 6 is a longitudinal sectional view of the upper portion of the power tool 1 according to the embodiment. FIG. 7 is a transverse sectional view of the upper portion of the power tool 1 according to the embodiment.

The power tool 1 according to the embodiment is an impact driver, which is an example of a screwing machine. The power tool 1 includes a housing 2, a rear cover 3, a hammer case 4, a battery mount 5, the motor 6, a reducer 7, a spindle 8, a striker 9, an anvil 10, a chuck sleeve 11, a fan 12, a controller 13, a trigger switch 14, a forward-reverse switch lever 15, an operation panel 16, a mode switch 17, and a lamp 18.

The housing 2 is formed from a synthetic resin. The housing 2 in the embodiment is formed from nylon. The housing 2 includes a left housing 2L and a right housing 2R. The right housing 2R is located on the right of the left housing 2L. As shown in FIG. 2, the left housing 2L and the right housing 2R are fastened together with multiple screws 2S. The housing 2 includes a pair of housing halves.

The housing 2 includes a motor compartment 21, a grip 22, and a controller compartment 23.

The motor compartment 21 is cylindrical. The motor compartment 21 accommodates at least a part of the motor 6.

The grip 22 protrudes downward from the motor compartment 21. The grip 22 serves as a grip housing extending downward from the left housing 2L and the right housing 2R. The trigger switch 14 is located above the grip 22. The grip 22 is grippable by an operator.

The controller compartment 23 is connected to a lower end of the grip 22. The controller compartment 23 accommodates the controller 13. The controller compartment 23 has larger outer dimensions than the grip 22 in the front-rear and lateral directions.

The rear cover 3 is formed from a synthetic resin. The rear cover 3 is located behind the motor compartment 21. The rear cover 3 accommodates at least a part of the fan 12. The fan 12 is inside the rear cover 3. The rear cover 3 covers an opening in the rear end of the motor compartment 21. The outer surface of the rear cover 3 has a diameter gradually decreasing from the front to the rear.

The motor compartment 21 has inlets 19. The rear cover 3 has outlets 20. Air outside the housing 2 flows into the internal space of the housing 2 through the inlets 19. Air inside the housing 2 flows out of the housing 2 through the outlets 20.

The hammer case 4 is formed from metal. The hammer case 4 in the embodiment is formed from aluminum. The hammer case 4 is located in front of the motor compartment 21. The hammer case 4 is connected to the front of the motor compartment 21. The hammer case 4 is cylindrical. The hammer case 4 includes a front portion 4F and a rear portion 4R. The front portion 4F has a smaller inner diameter than the rear portion 4R. The rear portion of the hammer case 4 is received in a front opening of the motor compartment 21. The rear portion of the hammer case 4 is fitted into the front of the motor compartment 21. The motor compartment 21 and the hammer case 4 are connected with a bearing box 24 in between. The bearing box 24 is located at least partially inside the hammer case 4. The bearing box 24 is fixed to the motor compartment 21 and the hammer case 4.

The hammer case 4 accommodates at least parts of the reducer 7, the spindle 8, the striker 9, and the anvil 10. The reducer 7 is located at least partially inside the bearing box 24. The reducer 7 includes multiple gears. The hammer case 4 serves as a gear case accommodating the gears.

The hammer case 4 is at least partially covered with a hammer case cover 4A. A bumper 4B is located on the front portion 4F of the hammer case 4. The bumper 4B is annular.

The battery mount 5 is located below the controller compartment 23. A battery pack 25 is attached to the battery mount 5 in a detachable manner. The battery pack 25 may include a secondary battery. The battery pack 25 in the embodiment may include a rechargeable lithium-ion battery. The battery pack 25 is attached to the battery mount 5 to power the power tool 1. The motor 6 is driven by power supplied from the battery pack 25. The controller 13 and the operation panel 16 operate on power supplied from the battery pack 25.

The motor 6 is a power source for the power tool 1. The motor 6 is a brushless inner-rotor motor. The motor 6 includes a stator 26 and a rotor 27. The rotor 27 is located at least partially inside the stator 26. The rotor 27 rotates relative to the stator 26. The rotor 27 rotates about the rotation axis AX extending in the front-rear direction. The rotor 27 is rotatable inside the stator 26.

The stator 26 includes a stator core 28, a front insulator 29, a rear insulator 30, and coils 31.

The stator core 28 is located radially outside the rotor 27. The stator core 28 includes multiple steel plates stacked on one another. The steel plates are metal plates formed from iron as a main component. The stator core 28 is cylindrical. The stator core 28 has multiple teeth to support the coils 31.

The front insulator 29 is located on the front of the stator core 28. The rear insulator 30 is located on the rear of the stator core 28. The front insulator 29 and the rear insulator 30 are electrical insulating members formed from a synthetic resin. The front insulator 29 partially covers the surfaces of the teeth. The rear insulator 30 partially covers the surfaces of the teeth.

The coils 31 are attached to the stator core 28 with the front insulator 29 and the rear insulator 30 between them. The stator 26 includes multiple coils 31. The coils 31 surround the teeth on the stator core 28 with the front insulator 29 and the rear insulator 30 between them. The coils 31 and the stator core 28 are electrically insulated from each other with the front insulator 29 and the rear insulator 30. The coils 31 are connected to one another with fuse terminals 38. The coils 31 are connected to the controller 13 with lead wires (not shown).

The stator 26 has its left outer circumference supported by the left housing 2L. The left housing 2L covers at least a part of a left portion of the hammer case 4. The stator 26 has its right outer circumference supported by the right housing 2R. The right housing 2R covers at least a part of a right portion of the hammer case 4.

The rotor 27 rotates about the rotation axis AX. The rotor 27 includes a core 32, a shaft 33, a rotor magnet 34, and a sensor magnet 35. The core 32 serves as a rotor core of the rotor 27. The shaft 33 serves as a rotor shaft of the rotor 27.

The core 32 and the shaft 33 are formed from steel. The shaft 33 protrudes from the end faces of the core 32 in the front-rear direction. The shaft 33 includes a front shaft 33F and a rear shaft 33R. The front shaft 33F protrudes frontward from the front end face of the core 32. The rear shaft 33R protrudes rearward from the rear end face of the core 32.

The rotor magnet 34 is fixed to the core 32. The rotor magnet 34 is cylindrical. The rotor magnet 34 surrounds the core 32.

The sensor magnet 35 is fixed to the core 32. The sensor magnet 35 is annular. The sensor magnet 35 is located on the front end face of the core 32 and the front end face of the rotor magnet 34.

A sensor board 37 is attached to the front insulator 29. The sensor board 37 is fastened to the front insulator 29 with a screw 29S. The sensor board 37 includes a circuit board and a rotation detector 37S. The circuit board is circular and has a hole at the center. The rotation detector 37S is supported by the circuit board. The sensor board 37 at least partially faces the sensor magnet 35. The rotation detector detects the position of the sensor magnet 35 to detect the position of the rotor 27 in the rotation direction.

The shaft 33 is supported by a rotor bearing 39 in a rotatable manner. The rotor bearing 39 includes a front rotor bearing 39F and a rear rotor bearing 39R. The front rotor bearing 39F supports the front shaft 33F in a rotatable manner. The rear rotor bearing 39R supports the rear shaft 33R in a rotatable manner.

The front rotor bearing 39F is held by the bearing box 24. The bearing box 24 has a recess 241. The recess 241 is recessed frontward from the rear surface of the bearing box 24. The front rotor bearing 39F is received in the recess 241. The rear rotor bearing 39R is held by the rear cover 3. The front end of the front shaft 33F is located inside the hammer case 4 through an opening of the bearing box 24.

A pinion gear 41 is located on the front end of the front shaft 33F. The pinion gear 41 is connected to at least a part of the reducer 7. The front shaft 33F is connected to the reducer 7 with the pinion gear 41.

The reducer 7 is located frontward from the motor 6. The reducer 7 connects the front shaft 33F and the spindle 8 together. The reducer 7 transmits rotation of the rotor 27 to the spindle 8. The reducer 7 rotates the spindle 8 at a lower rotational speed than the front shaft 33F. The reducer 7 includes a planetary gear assembly.

The reducer 7 includes multiple gears. The rotor 27 drives the gears in the reducer 7.

The reducer 7 includes multiple planetary gears 42 and an internal gear 43. The planetary gears 42 surround the pinion gear 41. The internal gear 43 surrounds the planetary gears 42. The pinion gear 41, the planetary gears 42, and the internal gear 43 are accommodated in the hammer case 4. Each planetary gear 42 meshes with the pinion gear 41. The planetary gears 42 are supported by the spindle 8 with a pin 42P in a rotatable manner. The spindle 8 is rotated by the planetary gears 42. The internal gear 43 has internal teeth that mesh with the planetary gears 42. The internal gear 43 is fixed to the bearing box 24. The internal gear 43 is constantly nonrotatable relative to the bearing box 24.

When the front shaft 33F rotates as driven by the motor 6, the pinion gear 41 rotates, and the planetary gears 42 revolve about the pinion gear 41. The planetary gears 42 meshing with the internal teeth on the internal gear 43 revolve. The revolving planetary gears 42 rotate the spindle 8, which is connected to the planetary gears 42 with the pin 42P, at a lower rotational speed than the shaft 33.

The spindle 8 is located frontward from at least a part of the motor 6. The spindle 8 is located frontward from the stator 26. The spindle 8 is located at least partially frontward from the rotor 27. The spindle 8 is located at least partially frontward from the reducer 7. The spindle 8 rotates with rotation of the rotor 27 transmitted by the reducer 7. The spindle 8 is an output unit in the power tool 1 rotatable by the rotor 27. The spindle 8 is an output shaft protruding from the hammer case 4 and rotatable by the gears in the reducer 7.

The spindle 8 includes a flange 44 and a rod 45. The rod 45 protrudes frontward from the flange 44. The planetary gears 42 are supported by the flange 44 with the pin 42P in a rotatable manner. The rotation axis of the spindle 8 aligns with the rotation axis AX of the motor 6. The spindle 8 rotates about the rotation axis AX. The spindle 8 is supported by a spindle bearing 46 in a rotatable manner. The spindle 8 includes a peripheral wall 81 on its rear end. The peripheral wall 81 surrounds the spindle bearing 46. The spindle bearing 46 supports the peripheral wall 81 on the spindle 8.

The bearing box 24 at least partially surrounds the spindle 8. The spindle bearing 46 is held by the bearing box 24. The bearing box 24 has a recess 242. The recess 242 is recessed rearward from the front surface of the bearing box 24. The spindle bearing 46 is received in the recess 242.

The spindle 8 has feed ports 92 for feeding lubricating oil. The lubricating oil includes grease. The feed ports 92 are located on the rod 45. The spindle 8 has an internal space 94 that contains the lubricating oil. The feed ports 92 connect with the internal space 94. The lubricating oil is fed to at least partially around the spindle 8 through the feed ports 92 with a centrifugal force from the spindle 8.

The striker 9 strikes the anvil 10 in the rotation direction in response to rotation of the spindle 8. The striker 9 includes a hammer 47, balls 48, and a coil spring 49. The striker 9 including the hammer 47 is accommodated in the hammer case 4.

The hammer 47 is located frontward from the reducer 7. The hammer 47 surrounds the spindle 8. The hammer 47 is held by the spindle 8. The balls 48 are placed between the spindle 8 and the hammer 47. The coil spring 49 is supported by the spindle 8 and the hammer 47.

The hammer 47 is cylindrical. The hammer 47 surrounds the rod 45. The hammer 47 has a hole 57 that receives the rod 45. The hammer 47 is rotatable together with the spindle 8. The rotation axis of the hammer 47 and the rotation axis of the spindle 8 align with the rotation axis AX of the motor 6. The hammer 47 rotates about the rotation axis AX.

The balls 48 are formed from metal such as steel. The balls 48 are located between the rod 45 and the hammer 47. The spindle 8 has a spindle groove 50. The spindle groove 50 receives at least parts of the balls 48. The spindle groove 50 is located in a portion of the outer surface of the rod 45.

The hammer 47 has a hammer groove 51. The hammer groove 51 receives at least parts of the balls 48. The hammer groove 51 is formed in a portion of the inner surface of the hammer 47.

The balls 48 are placed between the spindle groove 50 and the hammer groove 51. The balls 48 roll along the spindle groove 50 and the hammer groove 51. The hammer 47 is movable together with the balls 48. The spindle 8 and the hammer 47 are movable relative to each other in the axial direction and in the rotation direction within a movable range defined by the spindle groove 50 and the hammer groove 51.

The coil spring 49 generates an elastic force for moving the hammer 47 forward. The coil spring 49 is located between the flange 44 and the hammer 47. An annular recess 53 is located on a rear surface of the hammer 47. The recess 53 is recessed frontward from the rear surface of the hammer 47. A washer 54 is received in the recess 53. The rear end of the coil spring 49 is supported by the flange 44. The front end of the coil spring 49 is received in the recess 53 and supported by the washer 54.

The anvil 10 is located at least partially frontward from the hammer 47. The anvil 10 has an insertion hole 55. The insertion hole 55 receives a tip tool. The insertion hole 55 is located in the front end of the anvil 10. The tip tool is attached to the anvil 10.

The anvil 10 also has a hole 58. The hole 58 receives the front end of the rod 45. The hole 58 is located in the rear end of the anvil 10. The front end of the rod 45 is received in the hole 58.

The anvil 10 is rotatable together with the hammer 47. The rotation axis of the anvil 10, the rotation axis of the hammer 47, and the rotation axis of the spindle 8 align with the rotation axis AX of the motor 6. The anvil 10 rotates about the rotation axis AX. The anvil is supported by a pair of anvil bearings 56 in a rotatable manner. The pair of anvil bearings 56 are held by the hammer case 4.

The hammer 47 includes a cylindrical hammer body 471 and hammer protrusions 472. The recess 53 is located on the rear surface of the hammer body 471. The hammer protrusions 472 are located at the front of the hammer body 471. The hammer 47 has two hammer protrusions 472. The hammer protrusions 472 protrude frontward from the front of the hammer body 471.

The anvil 10 includes a rod-like anvil body 101 and anvil protrusions 102. The insertion hole 55 is formed in the front end of the anvil body 101. The tip tool is attached to the anvil body 101. The anvil protrusions 102 are located at the rear end of the anvil 10. The anvil 10 includes two anvil protrusions 102. The anvil protrusions 102 protrude radially outward from the rear end of the anvil body 101.

The hammer protrusions 472 and the anvil protrusions 102 can come in contact with each other. When the motor 6 operates while the hammer protrusions 472 and the anvil protrusions 102 are in contact with each other, the anvil 10 rotates together with the hammer 47 and the spindle 8.

The anvil 10 is struck by the hammer 47 in the rotation direction. When the anvil 10 receives a higher load during, for example, a screwing operation, power generated by the motor 6 alone may be insufficient to rotate the anvil 10, causing the anvil 10 and the hammer 47 to stop rotating. The spindle 8 and the hammer 47 are movable relative to each other in the axial direction and in the circumferential direction with the balls 48 in between. Although the hammer 47 stops rotating, the spindle 8 continues to rotate with power generated by the motor 6. When the hammer 47 stops rotating and the spindle 8 rotates, the balls 48 move backward as being guided along the spindle groove 50 and the hammer groove 51. The hammer 47 receives a force from the balls 48 to move backward with the balls 48. In other words, the hammer 47 moves backward when the anvil 10 stops rotating and the spindle 8 rotates. As the hammer 47 moves backward, the hammer protrusions 472 and the anvil protrusions 102 are out of contact from each other.

The coil spring 49 generates an elastic force for moving the hammer 47 forward. The hammer 47 moving backward moves forward under the elastic force from the coil spring 49. When moving forward, the hammer 47 receives a force in the rotation direction from the balls 48. In other words, the hammer 47 moves forward while rotating. The hammer protrusions 472 then come in contact with the anvil protrusions 102 while rotating. Thus, the anvil protrusions 102 are struck by the hammer protrusions 472 in the rotation direction. The anvil 10 receives power from the motor 6 and the inertial force from the hammer 47. The anvil 10 thus rotates with high torque about the rotation axis AX.

The chuck sleeve 11 surrounds a front portion of the anvil 10. The chuck sleeve 11 holds a tip tool received in the insertion hole 55.

The fan 12 is located rearward from the stator 26. The fan 12 generates an airflow for cooling the motor 6. The fan 12 has a smaller outer diameter than the stator core 28. This downsizes the rear cover 3 accommodating the fan 12.

The fan 12 is fastened to at least a part of the rotor 27. The fan 12 is fastened to the rear of the rear shaft 33R with a bush 61. The fan 12 is located between the rear rotor bearing 39R and the stator 26. The fan 12 rotates as the rotor 27 rotates. As the rear shaft 33R rotates, the fan 12 rotates together with the rear shaft 33R.

As the fan 12 rotates, air outside the housing 2 flows into the internal space of the housing 2 through the inlets 19. Air flowing into the internal space of the housing 2 flows through the housing 2 and cools the motor 6. As the fan 12 rotates, the air passing through the housing 2 flows out of the housing 2 through the outlets 20.

The controller 13 is accommodated in the controller compartment 23. The controller 13 outputs control signals for controlling the motor 6. The controller 13 includes a board on which multiple electronic components are mounted. Examples of the electronic components mounted on the board include a processor such as a central processing unit (CPU), a nonvolatile memory such as a read-only memory (ROM) or a storage device, a volatile memory such as a random-access memory (RAM), a transistor, and a resistor.

The controller 13 switches the control mode of the motor 6 in accordance with the operation of the power tool 1. The control mode of the motor 6 refers to a method or pattern for controlling the motor 6.

The trigger switch 14 is located on the grip 22. The trigger switch 14 activates the motor 6. The trigger switch 14 includes a trigger 14A and a switch body 14B. The switch body 14B is accommodated in the grip 22. The trigger 14A protrudes frontward from the upper front of the grip 22. The trigger 14A is operable by the operator. The trigger 14A is operable to switch the motor 6 between the driving state and the stopped state.

The forward-reverse switch lever 15 is located above the grip 22. The forward-reverse switch lever 15 is operable by the operator. The forward-reverse switch lever 15 switches the rotation direction of the motor 6 between forward and reverse. This operation switches the rotation direction of the spindle 8.

The operation panel 16 is located in the controller compartment 23. The operation panel 16 is operable to switch the control mode of the motor 6. The operation panel 16 is a plate. The controller compartment 23 has an opening 63 to receive the operation panel 16. The opening 63 is located in the upper surface of the controller compartment 23 frontward from the grip 22. The operation panel 16 is received at least partially in the opening 63.

The operation panel 16 includes an impact switch 64 and a specific switch 65. The impact switch 64 and the specific switch 65 are operable by the operator. At least either the impact switch 64 or the specific switch 65 switches the control mode of the motor 6.

The mode switch 17 is located above the trigger 14A. The mode switch 17 is operable by the operator. The mode switch 17 switches the control mode of the motor 6.

The lamp 18 illuminates ahead of the anvil 10. The lamp 18 emits illumination light to illuminate ahead of the power tool 1. The lamp 18 is held on the front end of the motor compartment 21. The lamp 18 includes, for example, a light-emitting diode (LED).

The lamp 18 includes a first lamp 18L and a second lamp 18R. The first lamp 18L is located on the left of the hammer case 4. The second lamp 18R is located on the right of the hammer case 4. The first lamp 18L is located on the left of the anvil 10. The second lamp 18R is located on the right of the anvil 10.

As shown in FIG. 6, the front shaft 33F has a recess 331F on its front end. The recess 331F reduces a load on the pinion gear 41. The recess 331F also reduces vibrations of the rotor 27.

As shown in FIG. 6, the rear shaft 33R has a recess 331R on its rear end. The recess 331R allows the rear rotor bearing 39R to be press-fitted to the rear shaft 33R easily. The recess 331R also reduces vibrations of the rotor 27.

Rotor

Figure 8:
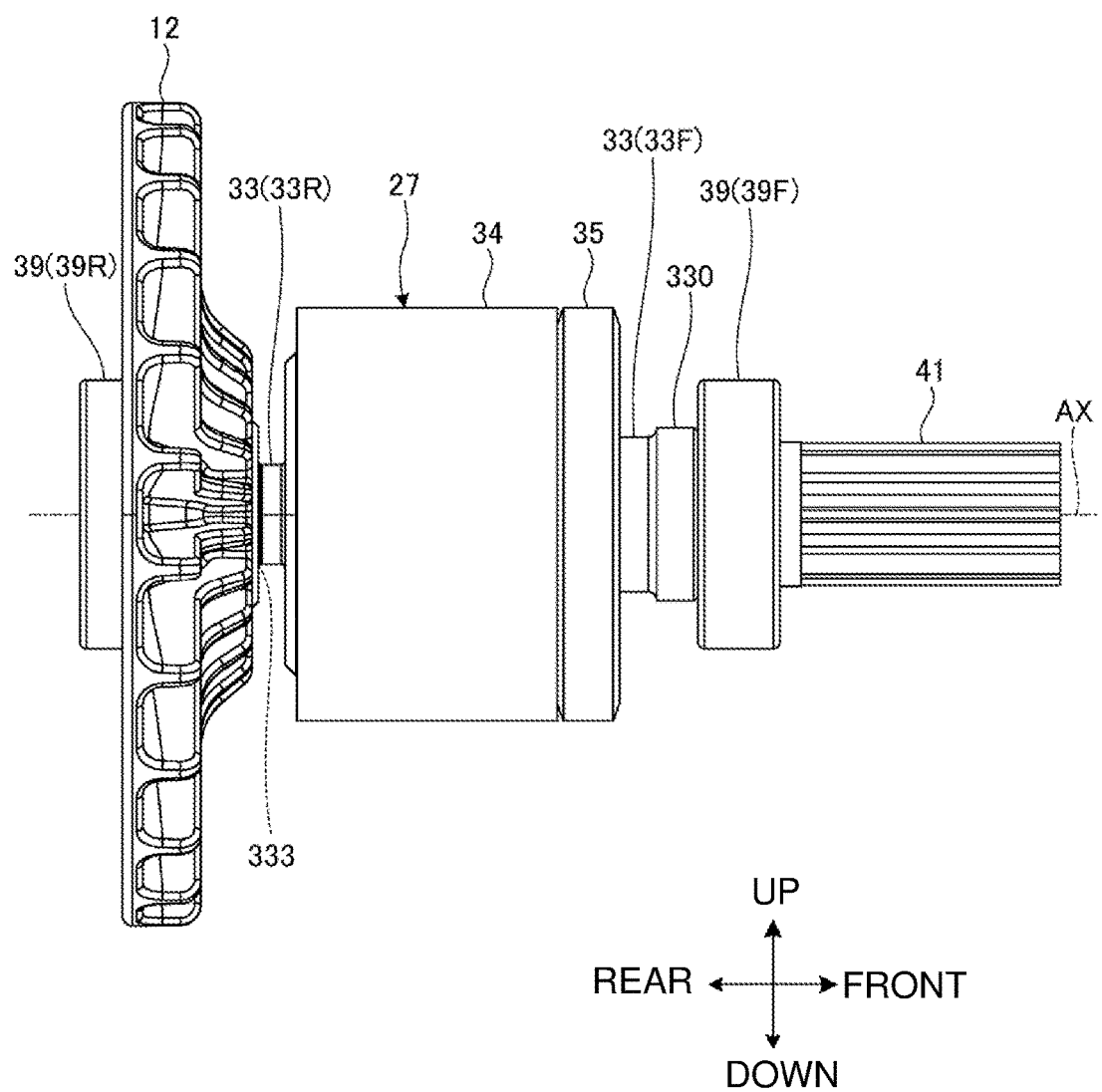
FIG. 8 is a side view of a rotor, a rotor bearing, and a fan in the embodiment.
Figure 9:
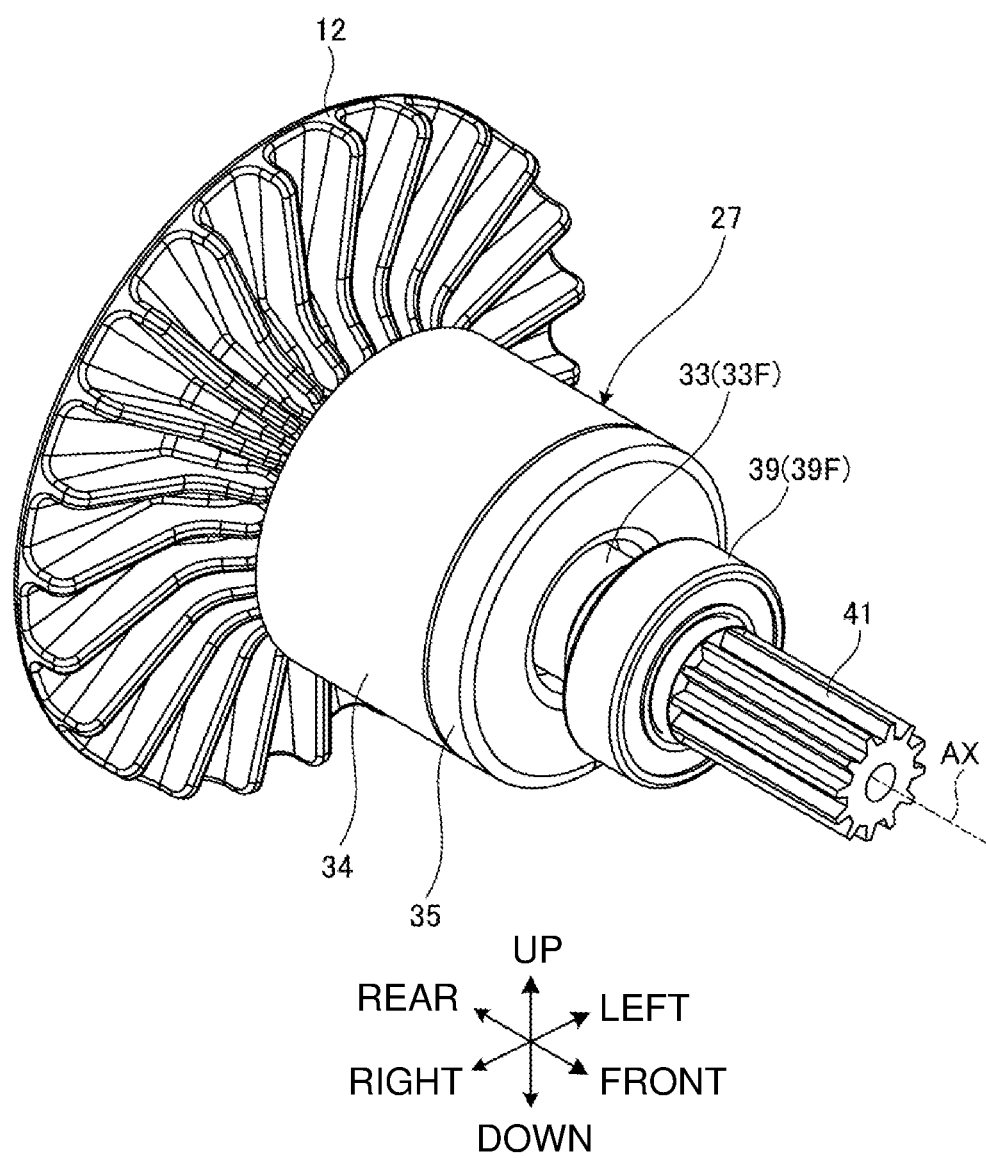
FIG. 9 is a perspective view of the rotor, the rotor bearing, and the fan in the embodiment.
Figure 10:
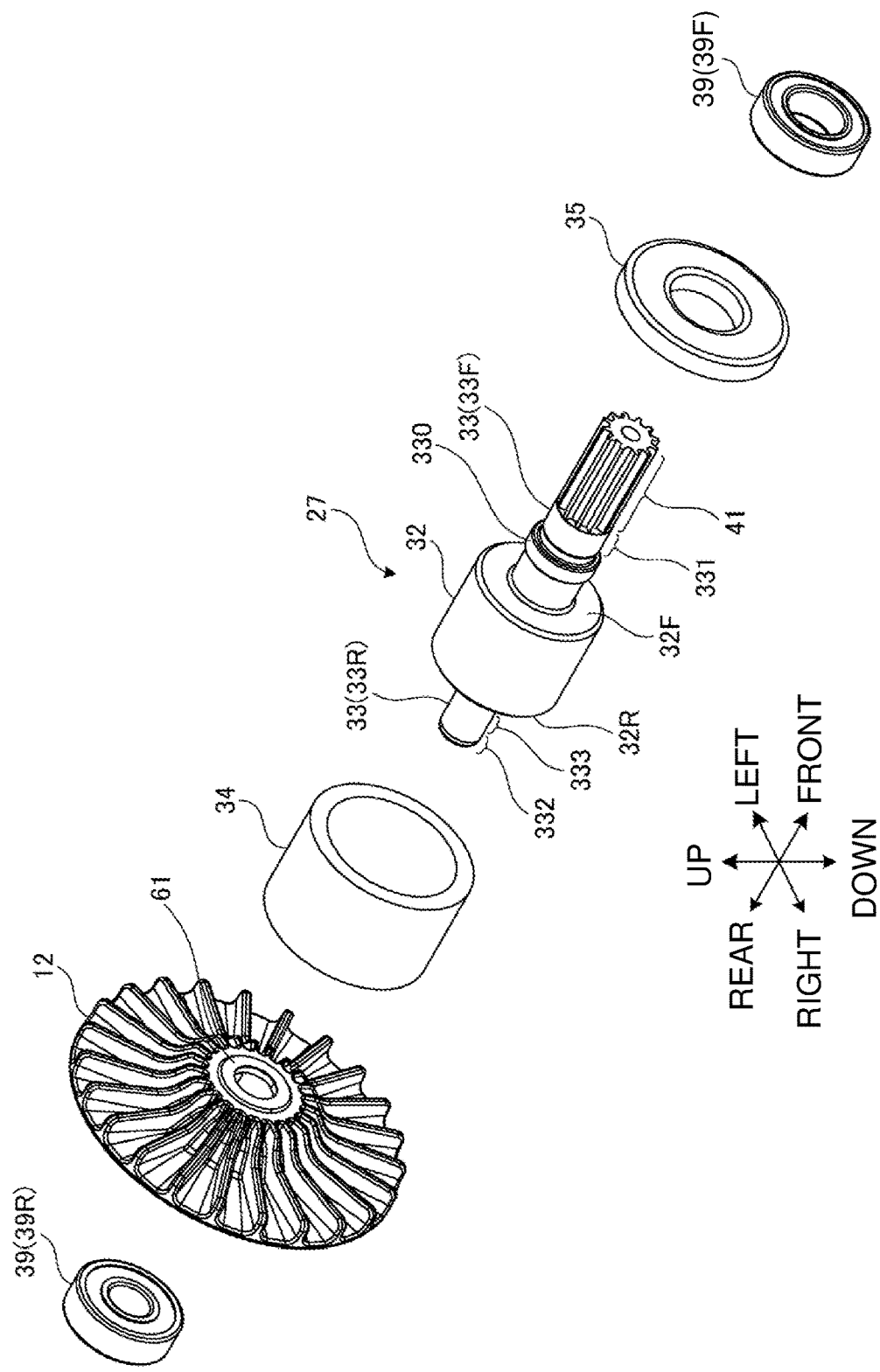
FIG. 10 is an exploded perspective view of the rotor, the rotor bearing, and the fan in the embodiment.
Figure 11:
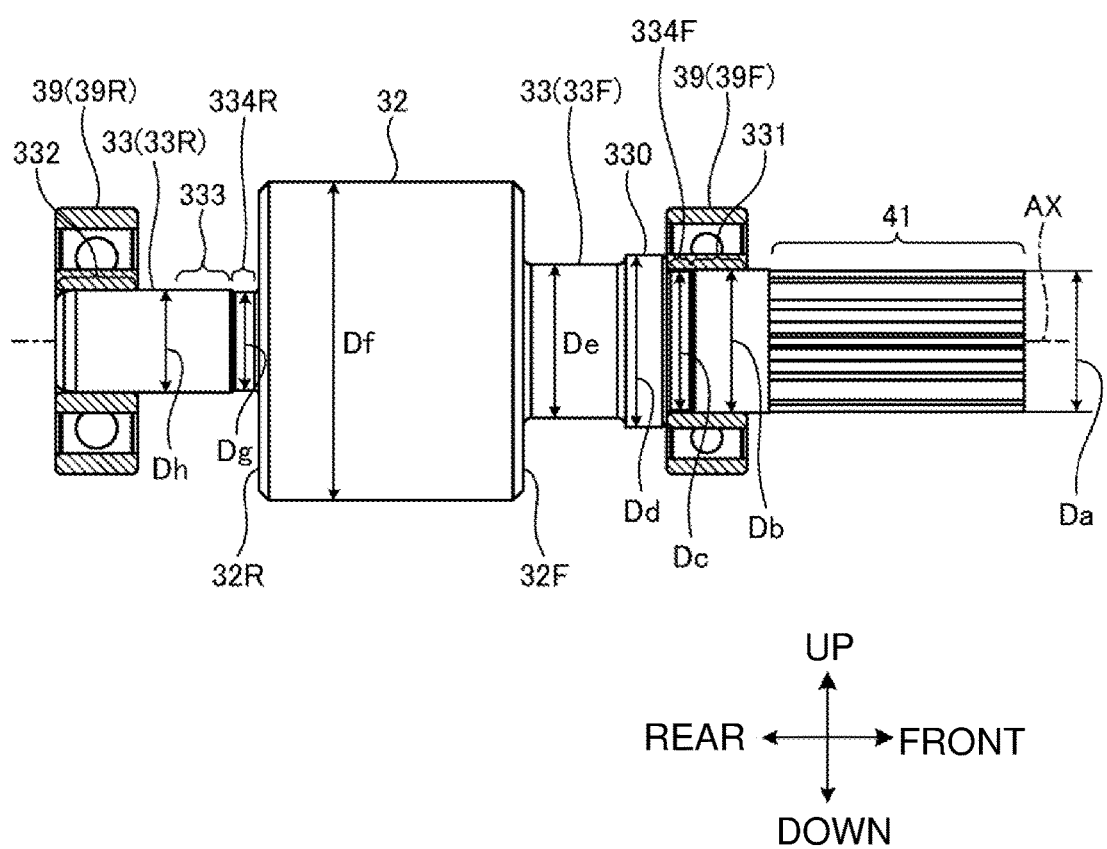
FIG. 11 is a side view of a core and a shaft in the embodiment.

FIG. 8 is a side view of the rotor 27, the rotor bearing 39, and the fan 12 in the embodiment. FIG. 9 is a perspective view of the rotor 27, the rotor bearing 39, and the fan 12 in the embodiment. FIG. 10 is an exploded perspective view of the rotor 27, the rotor bearing 39, and the fan 12 in the embodiment. FIG. 11 is a side view of the core 32 and the shaft 33 in the embodiment.

The rotor 27 includes the core 32, the shaft 33, the rotor magnet 34, and the sensor magnet 35. The shaft 33 protrudes from the end faces of the core 32. The rotor magnet 34 surrounds the core 32. The sensor magnet 35 faces an end face of the core 32.

The core 32 is formed from steel. The core 32 is a solid cylinder.

The shaft 33 is formed from steel. The shaft 33 is integral with the core 32. The core 32 and the shaft 33 are formed as a single member. The shaft 33 protrudes from the end faces of the core 32 in the front-rear direction. The shaft 33 extends in the front-rear direction. The shaft 33 includes the front shaft 33F and the rear shaft 33R. The front shaft 33F protrudes frontward from a front end face 32F of the core 32. The rear shaft 33R protrudes rearward from a rear end face 32R of the core 32.

The core 32 and the shaft 33 together being a single member can avoid slipping relative to each other. This structure also allows the center axis of the core 32 to align with the center axis of the shaft 33. Thus, power from the motor 6 is properly transmitted to the anvil 10 through the spindle 8. The power tool 1 thus reduces performance deterioration.

The pinion gear 41 is located on the front end of the front shaft 33F. The pinion gear 41 is connected to at least a part of the reducer 7. The pinion gear 41 is integral with the front shaft 33F. The front shaft 33F and the pinion gear 41 are formed as a single member.

The core 32 and the shaft 33 are formed by, for example, cutting a steel solid cylinder. The pinion gear 41 is formed by cutting a part of the front shaft 33F.

With the front shaft 33F and the pinion gear 41 together being a single member, the upper portion of the power tool 1 is less likely to be upsized in the front-rear direction. For a pinion gear 41 to be press-fitted to the front end of a front shaft 33F, for example, the pinion gear 41 may include a press-fitting portion for the press-fitting. In this structure, the upper portion of the power tool 1 cannot be downsized in the front-rear direction.

In contrast, the front shaft 33F and the pinion gear 41 in the embodiment are formed as a single member to eliminate the press-fitting portion from the pinion gear 41. The upper portion of the power tool 1 is thus less likely to be upsized in the front-rear direction. The shaft 33 and the pinion gear 41 can avoid slipping relative to each other, thus enabling proper transmission of power from the motor 6 to the anvil 10 through the spindle 8. The power tool 1 thus reduces performance deterioration.

The rotor magnet 34 is a permanent magnet. The rotor magnet 34 is cylindrical. The rotor magnet 34 includes first permanent magnets with a first polarity and second permanent magnets with a second polarity. The first permanent magnets and the second permanent magnets alternate in the circumferential direction in the cylindrical rotor magnet 34. The rotor magnet 34 surrounds the core 32. The core 32 is located inside the rotor magnet 34. The rotor magnet 34 is fixed to the core 32 with an adhesive.

The sensor magnet 35 is a permanent magnet. The sensor magnet 35 is annular. The sensor magnet 35 is fixed to an end face of the core 32. The sensor magnet 35 in the embodiment is fixed to the front end face 32F of the core 32 with an adhesive. The sensor magnet 35 is located frontward from the core 32 and the rotor magnet 34. The sensor magnet 35 surrounds the front shaft 33F.

The shaft 33 is supported by the rotor bearing 39 in a rotatable manner. The rotor bearing 39 includes the front rotor bearing 39F and the rear rotor bearing 39R. The front rotor bearing 39F supports the front shaft 33F in a rotatable manner. The rear rotor bearing 39R supports the rear shaft 33R in a rotatable manner.

As shown in FIGS. 6 and 7, the front rotor bearing 39F is held by the bearing box 24. The rear rotor bearing 39R is held by the rear cover 3.

The front rotor bearing 39F supports the front shaft 33F, and the rear rotor bearing 39R supports the rear shaft 33R. The rotor 27 can thus rotate properly.

The front rotor bearing 39F supports a front support portion 331. The front support portion 331 is defined on the front shaft 33F and between the rear end of the front shaft 33F and the rear end of the pinion gear 41. The rear rotor bearing 39R supports a rear support portion 332. The rear support portion 332 is defined between the front end and the rear end of the rear shaft 33R. The rear end of the front shaft 33F includes the boundary between the front shaft 33F and the front end face 32F of the core 32. The front end of the rear shaft 33R includes the boundary between the rear shaft 33R and the rear end face 32R of the core 32.

The fan 12 is fastened to the rear of the rear shaft 33R with the bush 61. The fan 12 is fastened to a fan receiving portion 333. The fan receiving portion 333 is defined between the front end and the rear end of the rear shaft 33R. The fan receiving portion 333 is located frontward from the rear support portion 332.

The front shaft 33F has a protrusion 330. The protrusion 330 is located between the front end face 32F of the core 32 and the front rotor bearing 39F.

The front shaft 33F includes a transition portion 334F between the protrusion 330 and the front support portion 331. The pinion gear 41 has an outer diameter Da smaller than an outer diameter db of the front support portion 331. The transition portion 334F has an outer diameter Dc smaller than the outer diameter db of the front support portion 331. The outer diameter Dc of the transition portion 334F is larger than the outer diameter Da of the pinion gear 41. The protrusion 330 has an outer diameter Dd larger than the outer diameter db of the front support portion 331. The portion of the front shaft 33F located rearward from the protrusion 330 has an outer diameter De smaller than the outer diameter Dd of the protrusion 330. The outer diameter De is larger than the outer diameter db. In other words, Dd>De>db>Dc>Da.

The rear shaft 33R includes a transition portion 334R between the rear end face 32R of the core 32 and the fan receiving portion 333. The transition portion 334R has an outer diameter Dg smaller than an outer diameter Dh of the rear support portion 332 and the fan receiving portion 333. In other words, Dh>Dg.

Also, Dd>De>db>Dc>Da>Dh>Dg.

In other words, the outer diameter De of the front shaft 33F is larger than the outer diameter Dh of the rear shaft 33R. In other words, the front shaft 33F is thicker than the rear shaft 33R.

The rotor 27 including the transition portion 334F and the transition portion 334R is easy to manufacture.

The protrusion 330 has a step on its front and rear. The step on the front of the protrusion 330 is defined by the front surface of the protrusion 330 and the outer surface of the transition portion 334F. The step on the rear of the protrusion 330 is defined by the rear surface of the protrusion 330 and the outer surface of the front shaft 33F located behind the protrusion 330. The front surface of the protrusion 330 is in contact with a part of the rear surface of the front rotor bearing 39F. In other words, the step on the front of the protrusion 330 is in contact with the front rotor bearing 39F. The front rotor bearing 39F is press-fitted to the front shaft 33F from the front, and the front surface of the protrusion 330 comes in contact with a part of the rear surface of the front rotor bearing 39F. The front rotor bearing 39F is thus placed at an appropriate position. The protrusion 330 is located between the rear end of the front shaft 33F and the front support portion 331. The protrusion 330 protrudes radially outward from the outer surface of the front shaft 33F. The protrusion 330 surrounds the rotation axis AX. The protrusion 330 is annular in a plane orthogonal to the rotation axis AX.

The sensor magnet 35 is fixed to the front end face 32F of the core 32 with an adhesive. In this case, the adhesive may leak from between the sensor magnet 35 and the core 32 or between the sensor magnet 35 and the front shaft 33F located radially inward from the sensor magnet 35 during, for example, an assembly operation of the rotor 27. Additionally, the adhesive may melt with heat generated by the motor 6 and leak from between the sensor magnet 35 and the core 32.

In the present embodiment, the adhesive leaking from between the sensor magnet 35 and the core 32 is restricted by the protrusion 330 from entering the front rotor bearing 39F (front support portion 331).

The front shaft 33F has a larger outer diameter than the rear shaft 33R. In other words, the front shaft 33F is thicker than the rear shaft 33R. The pinion gear 41 can be easily formed on the front shaft 33F by, for example, cutting. When the core 32 and the pinion gear 41 are twisted relative to each other, the front shaft 33F being thicker can withstand the torsion. The rear shaft 33R receives no large torsion and may thus be thinner.

The front rotor bearing 39F has an inner diameter larger than the outer diameter of the pinion gear 41. To assemble the rotor 27, the front rotor bearing 39F is thus fitted onto the front shaft 33F from the front and placed at the front support portion 331.

Figure 12:
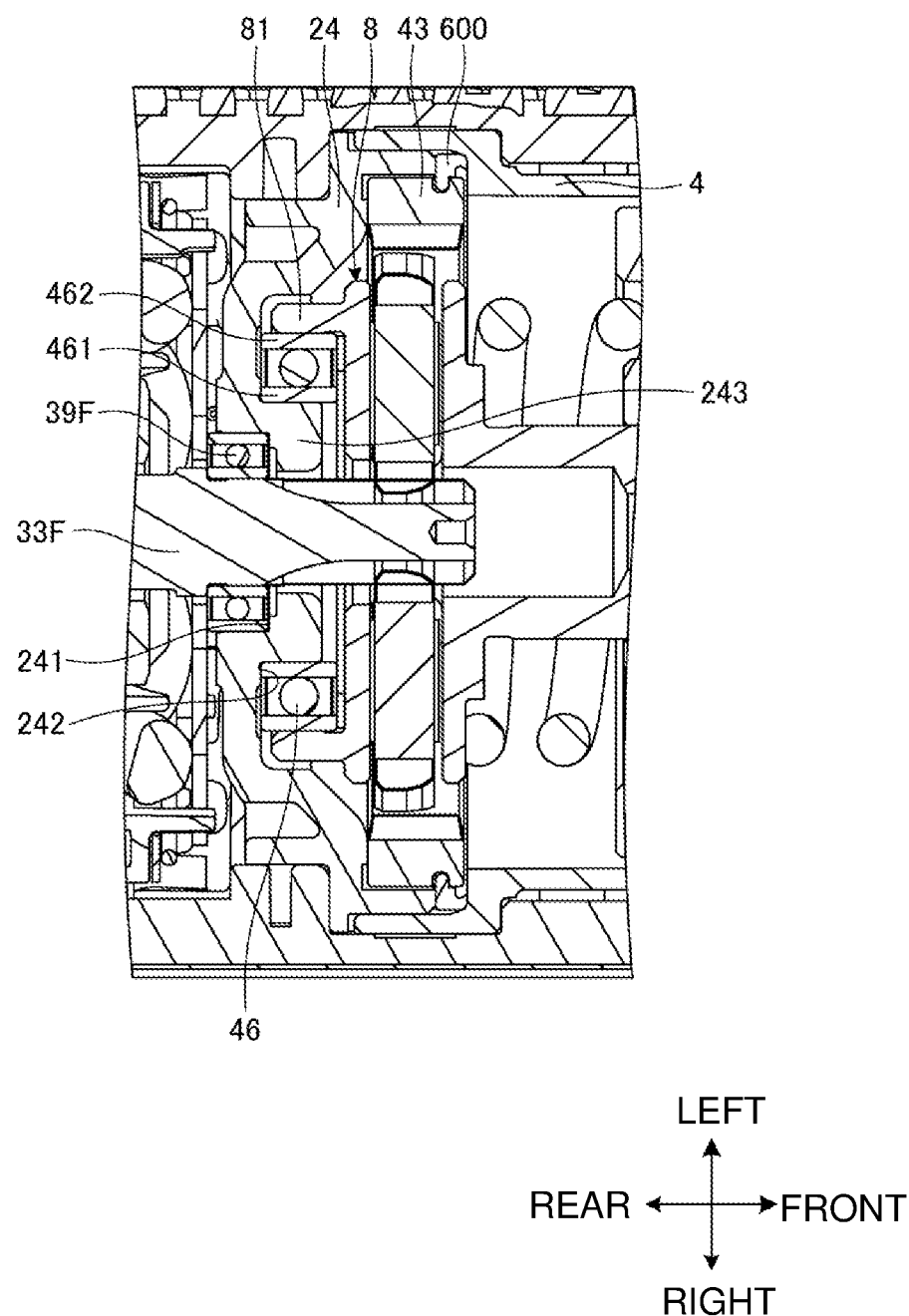
FIG. 12 is a partial transverse sectional view of the power tool according to the embodiment.

FIG. 12 is a partial transverse sectional view of the power tool 1 according to the embodiment, corresponding to a partial enlarged view of FIG. 7.

The front rotor bearing 39F and the spindle bearing 46 are held by the bearing box 24. The bearing box 24 has the recess 241 and the recess 242. The recess 241 is recessed frontward from the rear surface of the bearing box 24. The recess 242 is recessed rearward from the front surface of the bearing box 24. The front rotor bearing 39F is received in the recess 241. The spindle bearing 46 is received in the recess 242. The bearing box 24 has a protrusion 243 radially inward from the recess 242. The spindle bearing 46 surrounds the protrusion 243.

The spindle 8 has the peripheral wall 81 on its rear end. The peripheral wall 81 surrounds the spindle bearing 46. The spindle bearing 46 supports the peripheral wall 81.

The front rotor bearing 39F has an outer diameter smaller than the inner diameter of the spindle bearing 46. The front rotor bearing 39F and the spindle bearing 46 at least partially overlap each other in the front-rear direction. In other words, the front rotor bearing 39F is at least partially located inside the spindle bearing 46. In this structure, the upper portion of the power tool 1 is less likely to be upsized in the front-rear direction.

The spindle bearing 46 includes an inner ring 461 and an outer ring 462. The inner ring 461 is fixed to the bearing box 24. The outer ring 462 is fixed to the spindle 8. The spindle bearing 46 surrounds the protrusion 243 on the bearing box 24. The peripheral wall 81 surrounds the spindle bearing 46. The inner ring 461 is fixed to the outer surface of the protrusion 243. The outer ring 462 is fixed to the inner surface of the peripheral wall 81. In this structure, the upper portion of the power tool 1 is less likely to be upsized in the radial direction.

A seal 600 is located between the internal gear 43 and the bearing box 24. The seal 600 is annular. The seal 600 has a protrusion on the inside. The protrusion protrudes radially inward. The protrusion on the seal 600 is received in a recess on the internal gear 43. The seal 600 has its front end in contact with the hammer case 4. This structure reduces deterioration of the sealing at boundaries between the internal gear 43, the bearing box 24, and the hammer case 4. This structure also restricts the seal 600 from moving forward.

Lamp

Figure 13:
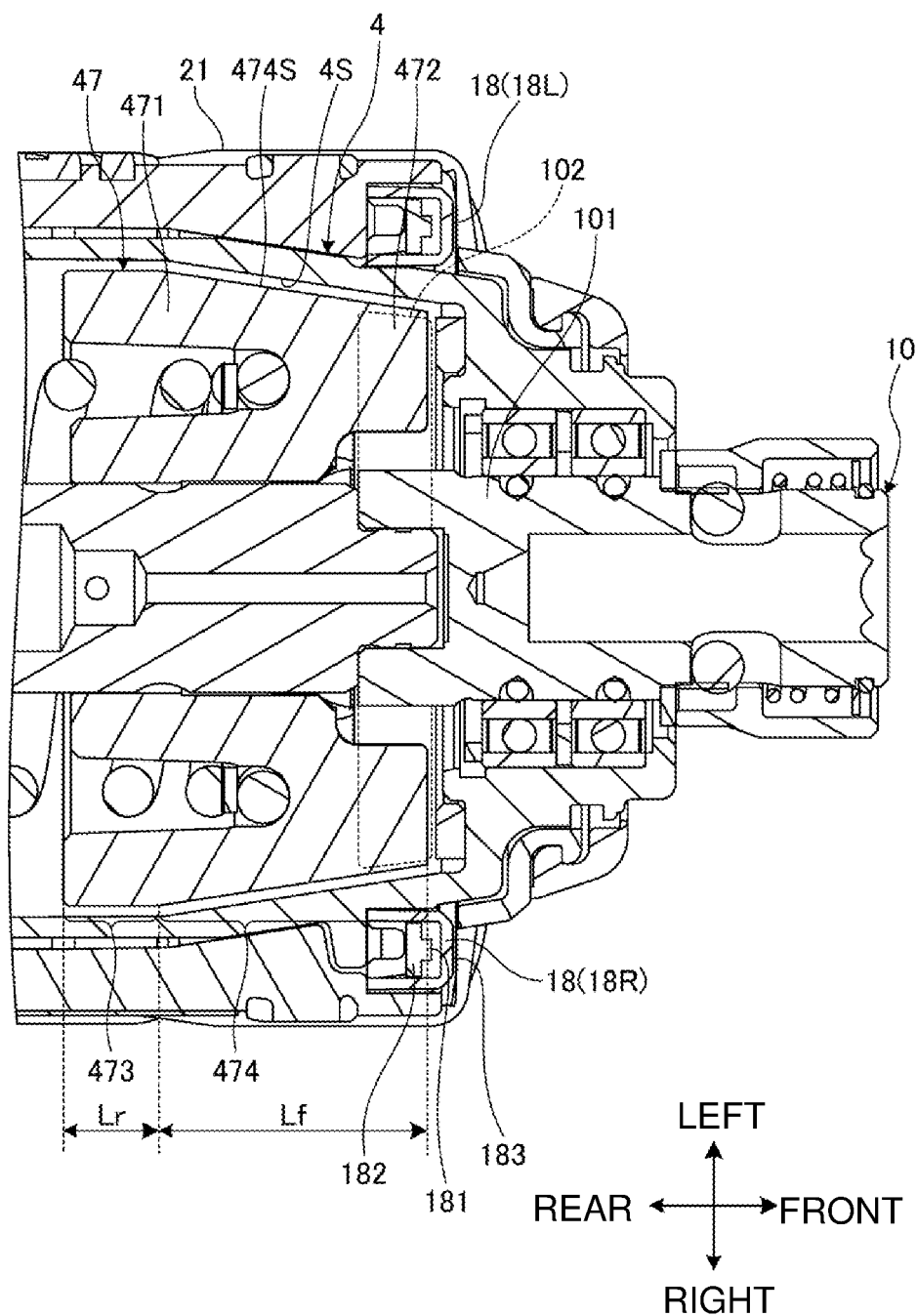
FIG. 13 is a partial transverse sectional view of the power tool according to the embodiment.

FIG. 13 is a partial transverse sectional view of the power tool 1 according to the embodiment, corresponding to a partial enlarged view of FIG. 7.

The lamp 18 includes the first lamp 18L and the second lamp 18R. The first lamp 18L is located on the left of the hammer case 4. The second lamp 18R is located on the right of the hammer case 4. The first lamp 18L is located on the left of the anvil 10. The second lamp 18R is located on the right of the anvil 10.

The lamp 18 overlaps at least a part of the anvil 10 in the front-rear direction. The first lamp 18L and the second lamp 18R are aligned with each other in the front-rear direction. The first lamp 18L and the second lamp 18R each overlap at least a part of the anvil 10 in the front-rear direction. In other words, the lamp 18 and at least a part of the anvil 10 are aligned with each other in the front-rear direction.

In this structure, the upper portion of the power tool 1 is less likely to be upsized in the radial direction. The anvil 10 has a smaller radial dimension than, for example, the hammer 47. The front end of the hammer 47 has a radial dimension smaller than the radial dimension of the rear end of the hammer 47. This structure allows the lamp 18 overlapping at least a part of the anvil 10 in the front-rear direction to be located radially inward from, for example, the outer surface of the motor compartment 21. The upper portion of the power tool 1 is less likely to be upsized in the radial direction.

The lamp 18 includes the first lamp 18L and the second lamp 18R. In this structure, the upper portion of the power tool 1 is less likely to be upsized in the lateral direction.

In the embodiment, the lamp 18 overlaps at least parts of the anvil protrusions 102 in the front-rear direction. The lamp 18 is thus at an appropriate position in the front-rear direction to appropriately illuminate ahead of the anvil 10.

The lamp 18 may overlap at least a part of the anvil body 101 in the front-rear direction.

The hammer 47 includes a straight trunk 473 and a smaller-diameter portion 474. The smaller-diameter portion 474 is located frontward from the straight trunk 473.

The straight trunk 473 includes a part of the outer surface of the hammer body 471. The straight trunk 473 is defined between the rear end of the hammer 47 and the rear end of the smaller-diameter portion 474. The straight trunk 473 is cylindrical. The straight trunk 473 has a constant outer diameter at each of multiple positions on the straight trunk 473 in the front-rear direction. The outer diameter of the straight trunk 473 refers to a distance between the rotation axis AX and the outer surface of the straight trunk 473 in the radial direction.

The smaller-diameter portion 474 includes a part of the outer surface of the hammer body 471 and the outer surfaces of the hammer protrusions 472. The smaller-diameter portion 474 is defined between the front end of the straight trunk 473 and the front end of the hammer 47. The smaller-diameter portion 474 has an outer diameter gradually decreasing toward the front. The outer diameter of the smaller-diameter portion 474 refers to a distance between the rotation axis AX and the outer surface of the smaller-diameter portion 474 in the radial direction.

The smaller-diameter portion 474 overlaps the anvil protrusions 102 in the front-rear direction. In this structure, the upper portion of the power tool 1 is less likely to be upsized in the radial direction.

In the front-rear direction, the smaller-diameter portion 474 has a dimension Lf larger than a dimension Lr of the straight trunk 473. In this structure, the upper portion of the power tool 1 is less likely to be upsized.

An outer surface 474S of the smaller-diameter portion 474 is parallel to an inner surface 4S of the hammer case 4. In this structure, the upper portion of the power tool 1 is less likely to be upsized. The outer surface of the hammer case 4 substantially corresponds to the straight trunk 473 and the smaller-diameter portion 474. In this structure, the lamp 18 is less likely to protrude laterally.

The lamp 18 is located at the front end of the motor compartment 21. As shown in FIGS. 4 and 7, the motor compartment 21 has a smaller dimension at its front end than the rear cover 3 in the lateral direction. A front portion of the power tool 1 is less likely to be upsized.

In the lateral direction, the lamp 18 does not protrude outward from the surface of the motor compartment 21. In the lateral direction, the lamp 18 does not protrude outward from the surface of the rear cover 3.

The motor compartment 21 has its left outer surface and right outer surface extending straight in the front-rear direction. The upper portion of the power tool 1 is less likely to be upsized.

As shown in FIG. 7, the rear cover 3 supports the rear of the rear shaft 33R. The rear cover 3 is fastened to the left housing 2L with a left screw 500L and to the right housing 2R with a right screw 500R.

The first lamp 18L is on the left of the hammer case 4 accommodating the gears and is supported by the left housing 2L. The second lamp 18R is on the right of the hammer case 4 accommodating the gears and is supported by the right housing 2R.

The position of the left housing 2L or of the rear cover 3 at which the left screw 500L is placed is located leftward from the position of the left housing 2L at which the first lamp 18L is located. The position of the right housing 2R or of the rear cover 3 at which the right screw 500R is placed is located rightward from the position of the right housing 2R at which the second lamp 18R is located. In other words, the housing 2 has a smaller lateral width at the position at which the lamp 18 is located than the rear cover 3.

The second lamp 18R includes a right light emitter 181, a right light circuit board 182, and a right transparent cover 183. The right light emitter 181 is mounted on the right light circuit board 182. The right transparent cover 183 is in front of the right light emitter 181 and the right light circuit board 182. The right light emitter 181 is located leftward from the right end of the right screw 500R.

The portion of the right housing 2R adjacent to a right portion 400R on the periphery of the rear portion 4R of the hammer case 4 is located leftward from the second lamp 18R.

Operation of Power Tool

The operation of the power tool 1 will now be described. To perform, for example, a screwing operation on a workpiece, a tip tool (screwdriver bit) for the screwing operation is placed into the insertion hole 55 in the anvil 10. The tip tool placed in the insertion hole 55 is held by the chuck sleeve 11. After the tip tool is attached to the anvil 10, the operator grips the grip 22 and operates the trigger switch 14. Power is then provided from the battery pack 25 to the motor 6 to activate the motor 6 and turn on the lamp 18 at the same time.

As the motor 6 is activated, the shaft 33 in the rotor 27 rotates. The rotational force of the shaft 33 is then transmitted to the planetary gears 42 through the pinion gear 41. The planetary gears 42 meshing with the internal teeth on the internal gear 43 revolve about the pinion gear 41 while rotating. The planetary gears 42 are supported by the spindle 8 with the pin 42P in a rotatable manner. The revolving planetary gears 42 rotate the spindle 8 at a lower rotational speed than the shaft 33.

When the spindle 8 rotates with the hammer protrusions 472 and the anvil protrusions 102 in contact with each other, the anvil 10 rotates together with the hammer 47 and the spindle 8. Thus, the screwing operation proceeds.

When the anvil 10 receives a predetermined or higher load as the screwing operation proceeds, the anvil 10 and the hammer 47 stop rotating. When the hammer 47 stops rotating and the spindle 8 rotates, the hammer 47 moves backward. Thus, the hammer protrusions 472 and the anvil protrusions 102 are out of contact from each other. The hammer 47 moving backward moves forward while rotating under the elastic force from the coil spring 49. Thus, the anvil 10 is struck by the hammer 47 in the rotation direction. The anvil 10 thus rotates about the rotation axis AX with high torque. The screw is thus tightened on the workpiece with high torque.

In the embodiment, the core 32 and the shaft 33 together being a single member can avoid slipping relative to each other. This structure also allows the center axis of the core 32 to align with the center axis of the shaft 33. Thus, power from the motor 6 is properly transmitted to the anvil 10 through the spindle 8. The power tool 1 thus reduces performance deterioration.

The shaft 33 has the protrusion 330. The protrusion 330 is located between an end face of the core 32 and the rotor bearing 39 and protrudes radially outward. The protrusion 330 reduces the likelihood that, for example, foreign matter such as an adhesive moves from the rear of the protrusion 330 to the rotor bearing 39.

The protrusion 330 surrounds the rotation axis AX. The annular protrusion 330 effectively reduces the likelihood that, for example, foreign matter such as an adhesive moves from the rear of the protrusion 330 to the rotor bearing 39.

The rotor 27 includes the sensor magnet 35 fixed to the end face of the core 32 with an adhesive. The sensor magnet 35 is thus properly fixed to the core 32. The adhesive may leak from between the sensor magnet 35 and the core 32 during, for example, an assembly operation of the rotor 27. Additionally, the adhesive may melt with heat generated by the motor 6 and leak from between the sensor magnet 35 and the core 32. The adhesive leaking from between the sensor magnet 35 and the core 32 is restricted by the protrusion 330 from entering the front rotor bearing 39F (front support portion 331).

The shaft 33 includes the front shaft 33F protruding frontward from the front end face 32F of the core 32, and the rear shaft 33R protruding rearward from the rear end face 32R of the core 32. The rotor bearing 39 includes the front rotor bearing 39F supporting the front shaft 33F and the rear rotor bearing 39R supporting the rear shaft 33R. The rotor 27 can thus rotate properly.

The front shaft 33F has a larger outer diameter than the rear shaft 33R. The pinion gear 41 can be easily formed on the front shaft 33F by, for example, cutting. When the core 32 and the pinion gear 41 are twisted relative to each other, the front shaft 33F being thicker can withstand the torsion. The rear shaft 33R receives no large torsion and may thus be thinner.

The pinion gear 41 is formed on the front end of the front shaft 33F by, for example, cutting. With the front shaft 33F and the pinion gear 41 together being a single member, the upper portion of the power tool 1 is less likely to be upsized in the front-rear direction. For a pinion gear 41 to be press-fitted to the front end of a front shaft 33F, for example, the pinion gear 41 may include a portion for the press-fitting. In this structure, the upper portion of the power tool 1 cannot be downsized in the front-rear direction. In the embodiment, the front shaft 33F and the pinion gear 41 formed as a single member eliminate the portion in the pinion gear 41 for the press-fitting. The upper portion of the power tool 1 is thus less likely to be upsized in the front-rear direction. The shaft 33 and the pinion gear 41 can avoid slipping relative to each other, thus enabling proper transmission of power from the motor 6 to the anvil 10 through the spindle 8. The power tool 1 thus reduces performance deterioration.

The front rotor bearing 39F has an inner diameter larger than the outer diameter of the pinion gear 41. To assemble the rotor 27, the front rotor bearing 39F is thus fitted onto the front shaft 33F from the front and placed at the front support portion 331.

The front rotor bearing 39F has an outer diameter smaller than the inner diameter of the spindle bearing 46. The front rotor bearing 39F and the spindle bearing 46 at least partially overlap each other in the front-rear direction. In other words, the front rotor bearing 39F is at least partially located inside the spindle bearing 46. In this structure, the upper portion of the power tool 1 is less likely to be upsized in the front-rear direction.

The spindle bearing 46 includes the inner ring 461 and the outer ring 462. The inner ring 461 is fixed to the bearing box 24. The outer ring 462 is fixed to the spindle 8. The spindle bearing 46 surrounds the protrusion 243 on the bearing box 24. The peripheral wall 81 on the spindle 8 surrounds the spindle bearing 46. The inner ring 461 is fixed to the outer surface of the protrusion 243. The outer ring 462 is fixed to the inner surface of the peripheral wall 81. In this structure, the upper portion of the power tool 1 is less likely to be upsized in the radial direction.

Other Embodiments

Figure 14A:
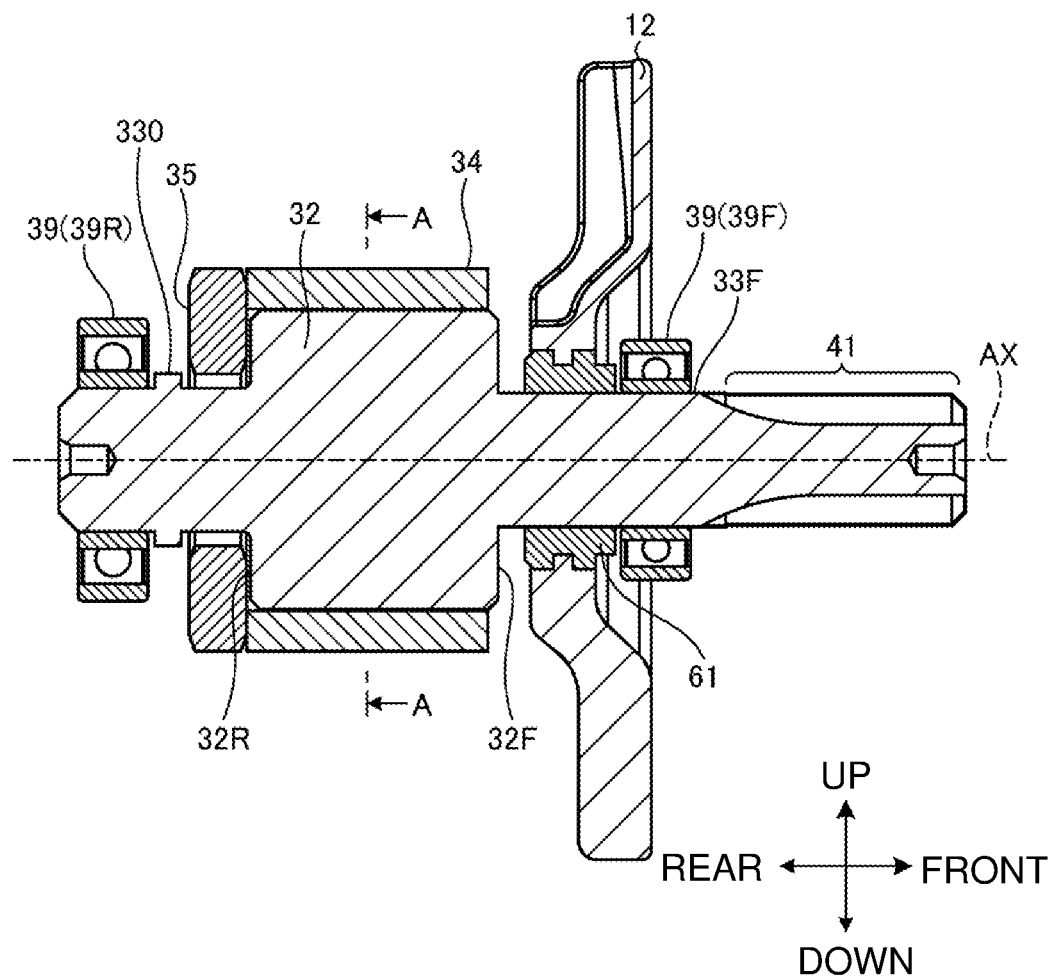
FIG. 14A is a side view of a rotor, a rotor bearing, and a fan according to a modification.
Figure 14B:
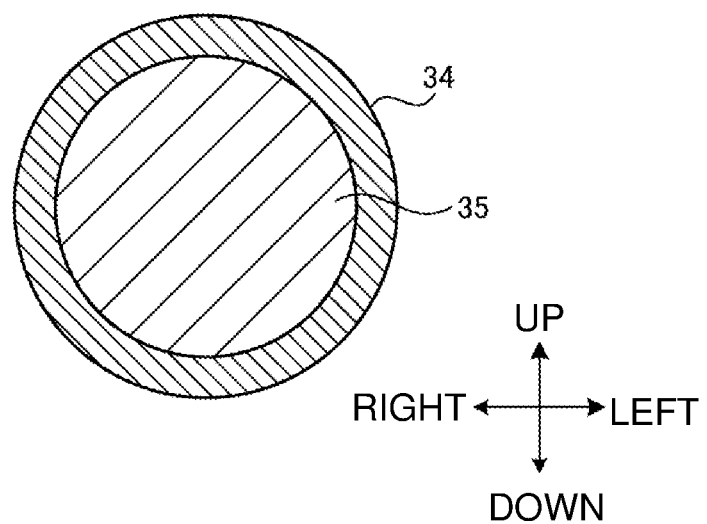
FIG. 14B is a cross-sectional view taken along line A-A in FIG. 14A as viewed in the direction indicated by arrows.

FIG. 14A is a side view of a rotor 27, a rotor bearing 39, and a fan 12 according to a modification. FIG. 14B is a cross-sectional view taken along line A-A in FIG. 14A as viewed in the direction indicated by arrows.

As shown in FIGS. 14A and 14B, the fan 12 may be fastened to the front shaft 33F. The sensor magnet 35 may be fixed to the rear end face 32R of the core 32.

Figure 15A:
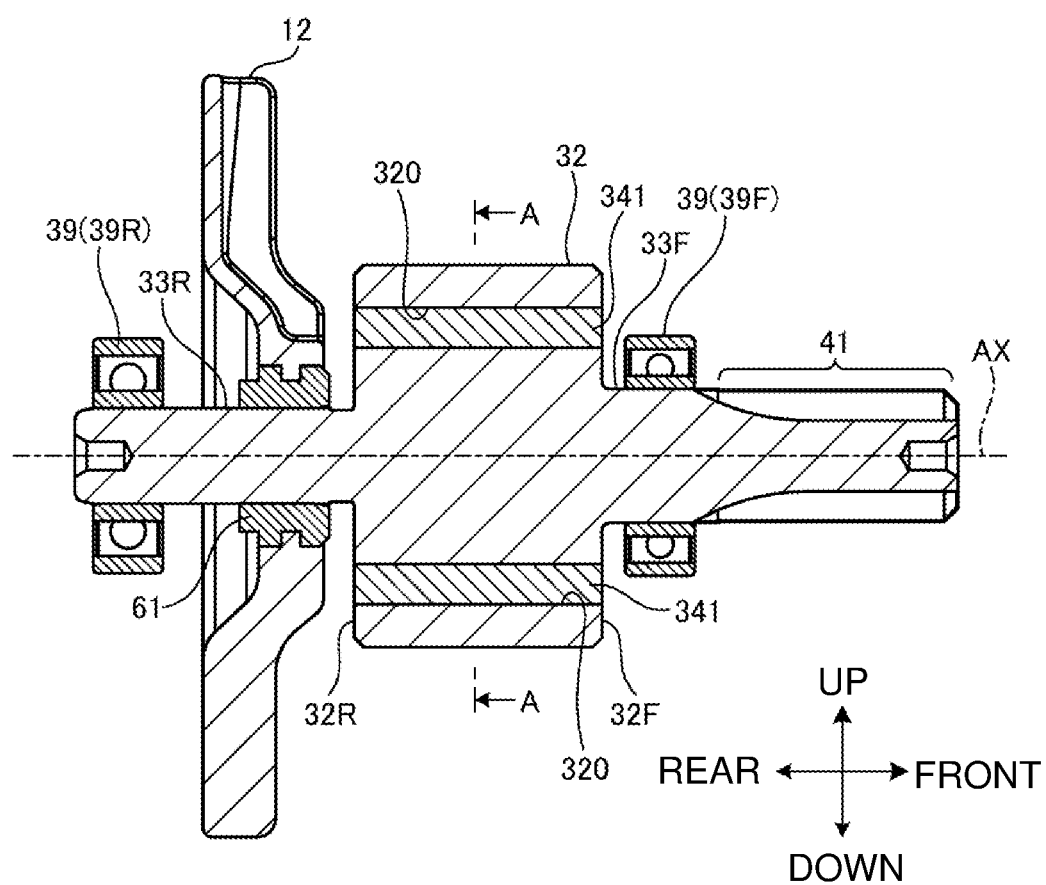
FIG. 15A is a side view of a rotor, a rotor bearing, and a fan according to a modification.
Figure 15B:
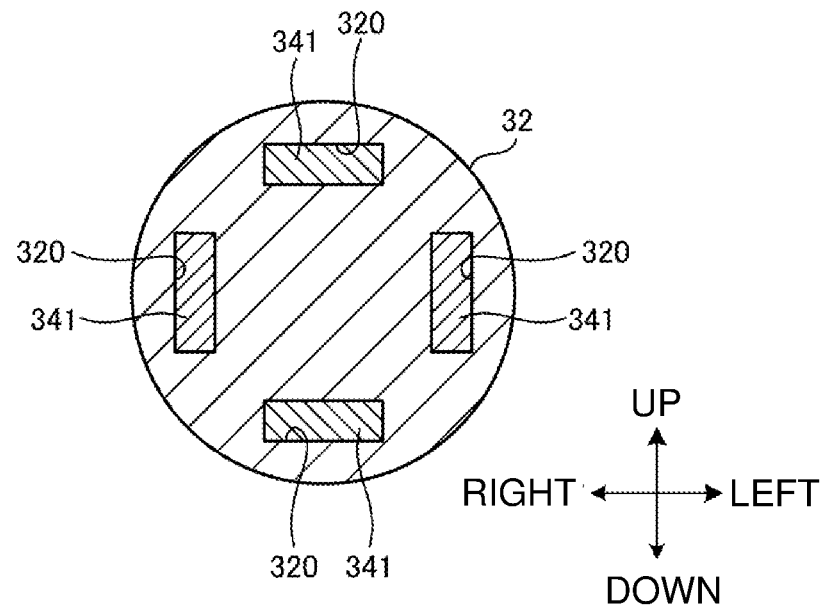
FIG. 15B is a cross-sectional view taken along line A-A in FIG. 15A as viewed in the direction indicated by arrows.

FIG. 15A is a side view of a rotor 27, a rotor bearing 39, and a fan 12 according to another modification. FIG. 15B is a cross-sectional view taken along line A-A in FIG. 15A as viewed in the direction indicated by arrows.

As shown in FIGS. 15A and 15B, rotor magnets 341 may be placed inside the core 32. In the example shown in FIGS. 15A and 15B, the core 32 has through-holes 320 extending in the front-rear direction. The through-holes 320 connect the front end face 32F and the rear end face 32R to each other. The through-holes 320 are formed by boring through the core 32. The core 32 has four through-holes 320 located at intervals in the circumferential direction. Each through-hole 320 receives the rotor magnet 341. The sensor magnet 35 may be eliminated.

Figure 16A:
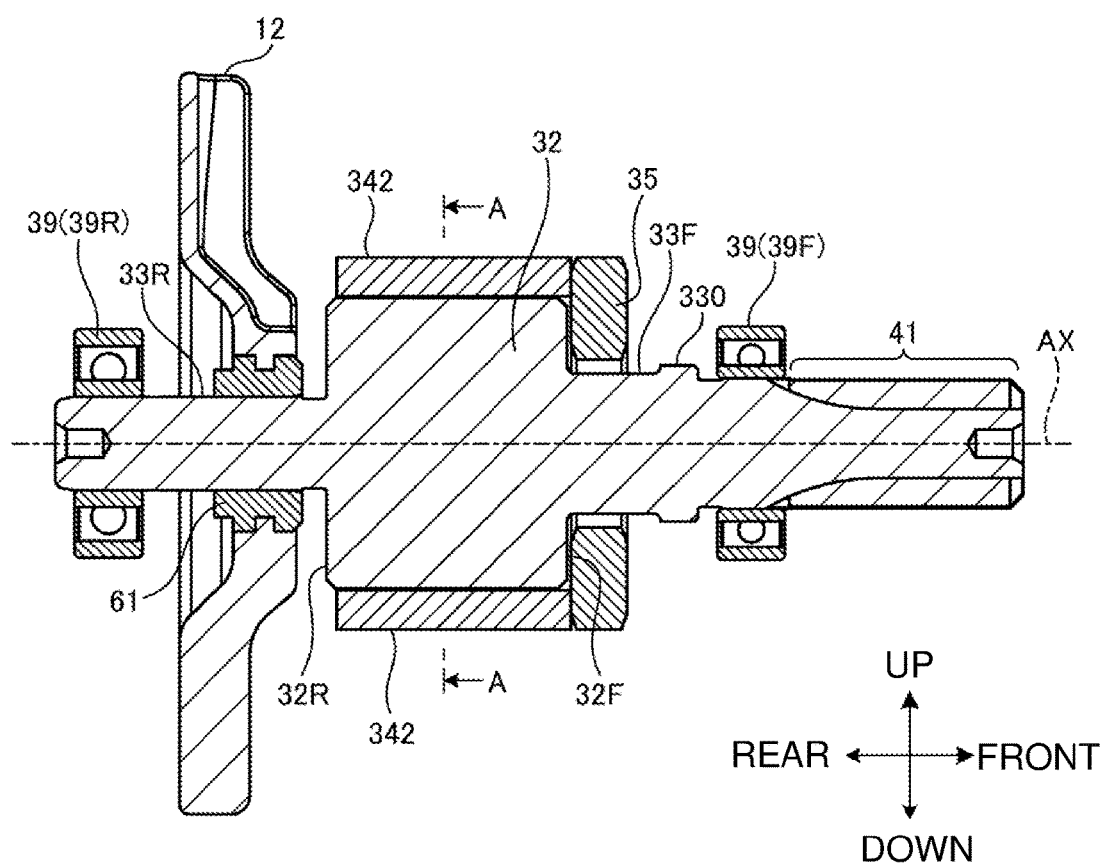
FIG. 16A is a side view of a rotor, a rotor bearing, and a fan according to a modification.
Figure 16B:
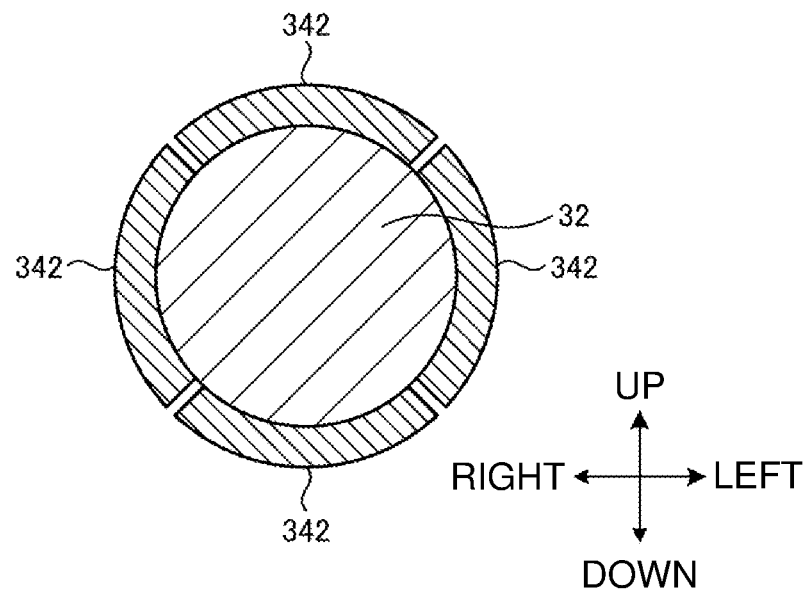
FIG. 16B is a cross-sectional view taken along line A-A in FIG. 16A as viewed in the direction indicated by arrows.

FIG. 16A is a side view of a rotor 27, a rotor bearing 39, and a fan 12 according to another modification. FIG. 16B is a cross-sectional view taken along line A-A in FIG. 16A as viewed in the direction indicated by arrows.

As shown in FIGS. 16A and 16B, multiple rotor magnets 342 may surround the core 32. The rotor magnets 342 are fixed to the outer surface of the core 32. The rotor magnets 342 are arc-shaped in a plane orthogonal to the rotation axis AX. Four rotor magnets 342 are located at intervals in the circumferential direction. In FIGS. 16A and 16B, the sensor magnet 35 is located on the front end face 32F of the core 32. The sensor magnet 35 may be eliminated.

Figure 17A:
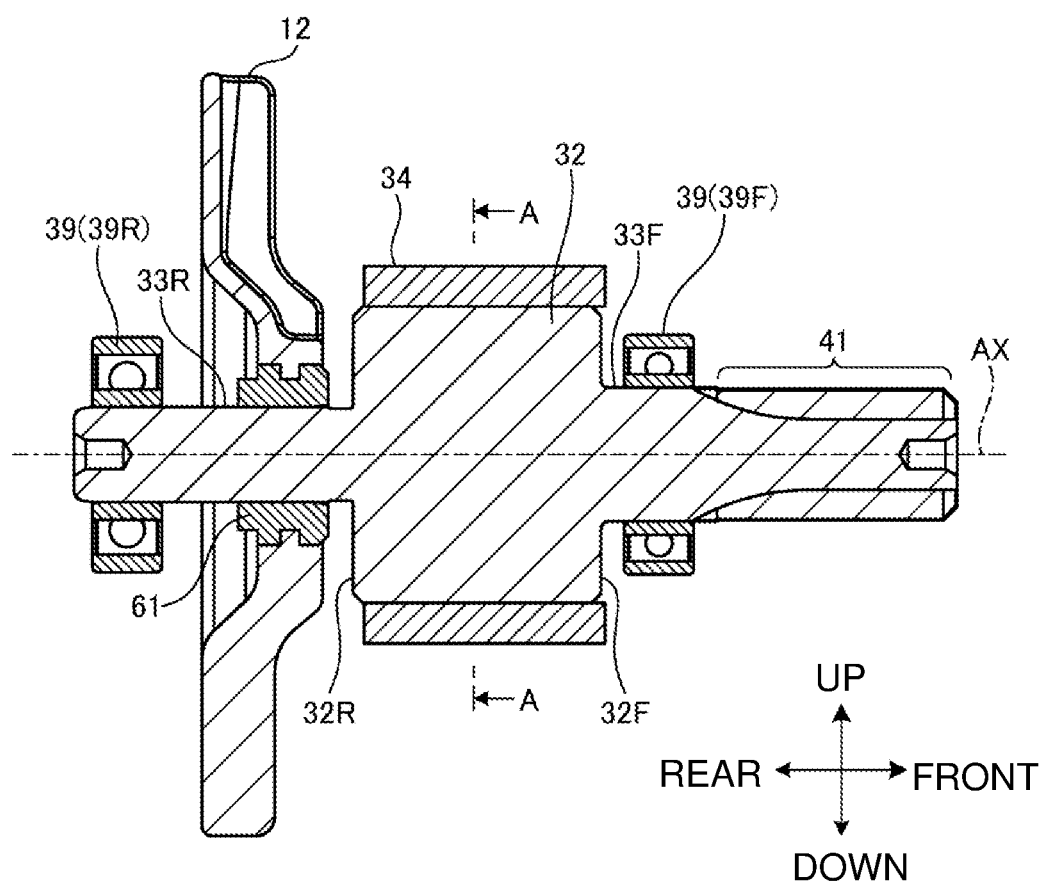
FIG. 17A is a side view of a rotor, a rotor bearing, and a fan according to a modification.
Figure 17B:
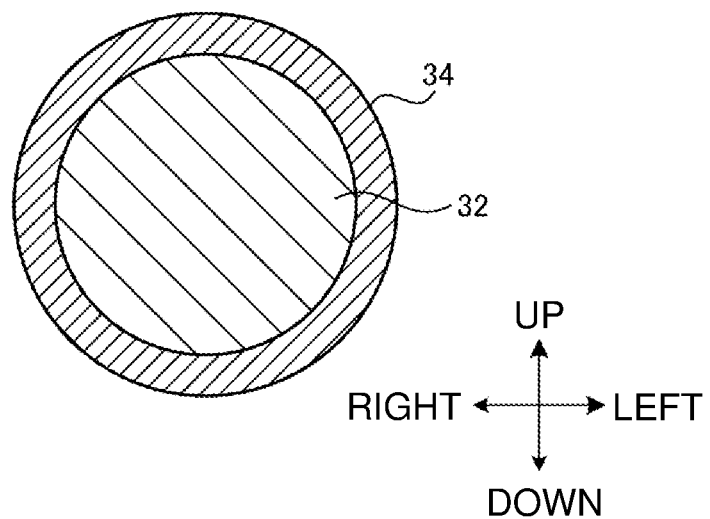
FIG. 17B is a cross-sectional view taken along line A-A in FIG. 17A as viewed in the direction indicated by arrows.

FIG. 17A is a side view of a rotor 27, a rotor bearing 39, and a fan 12 according to another modification. FIG. 17B is a cross-sectional view taken along line A-A in FIG. 17A as viewed in the direction indicated by arrows.

As shown in FIGS. 17A and 17B, the cylindrical rotor magnet 34 may surround the core 32, and the sensor magnet 35 may be eliminated.

In the above embodiment, the power tool 1 is an impact driver. The power tool 1 is not limited to an impact driver, and may be, for example, a driver drill for a screwing operation, an angle drill for a drilling operation, a hammer or a hammer drill that strikes a drill bit, a grinder that rotates a grinding disc, a circular saw that rotates a saw blade, or a reciprocating saw that reciprocates a blade. The hammer case is referred to as a gear case for a driver drill.

In the above embodiment, the power tool 1 may use utility power (alternating-current power supply) instead of the battery pack 25.

REFERENCE SIGNS LIST

1 power tool
2 housing
2L left housing
2R right housing
2S screw
3 rear cover
4 hammer case (gear case)
4A hammer case cover
4B bumper
4F front portion
4R rear portion
4S inner surface
5 battery mount
6 motor
7 reducer
8 spindle
9 striker
10 anvil
11 chuck sleeve
12 fan
13 controller
14 trigger switch
14A trigger
14B switch body
15 forward-reverse switch lever
16 operation panel
17 mode switch
18 lamp
18L first lamp
18R second lamp
19 inlet
20 outlet
21 motor compartment
22 grip
23 controller compartment
24 bearing box
25 battery pack
26 stator
27 rotor
28 stator core
29 front insulator
29S screw
30 rear insulator
31 coil
32 core
32F front end face
32R rear end face
33 shaft
33F front shaft
33R rear shaft
34 rotor magnet
35 sensor magnet
37 sensor board
37S rotation detector
38 fuse terminal
39 rotor bearing
39F front rotor bearing
39R rear rotor bearing
41 pinion gear
42 planetary gear
42P pin
43 internal gear
44 flange
45 rod
46 spindle bearing
47 hammer
48 ball
49 coil spring
50 spindle groove
51 hammer groove
53 recess
54 washer
55 insertion hole
56 anvil bearing
57 hole
58 hole
61 bush
63 opening
64 impact switch
65 specific switch
92 feed port
94 internal space
81 peripheral wall
101 anvil body
102 anvil protrusion
181 right light emitter
182 right light circuit board
183 right transparent cover
241 recess
242 recess
243 protrusion
320 through-hole
330 protrusion
331 front support portion
331F recess
331R recess
332 rear support portion
333 fan receiving portion
334F transition portion
334R transition portion
341 rotor magnet
342 rotor magnet
400R right portion
461 inner ring
462 outer ring
471 hammer body
472 hammer protrusion
473 straight trunk
474 smaller-diameter portion
474S outer surface
500L left screw
500R right screw
600 seal
AX rotation axis

What is claimed is:

1. A power tool, comprising:
   a motor including
      a rotor bearing, and
      a rotor rotatable about a rotation axis extending in a front-rear direction, the rotor including
         a rotor magnet,
         a core to which the rotor magnet is fixed, and
         a shaft protruding from an end face of the core and supported by the rotor bearing, the shaft and the core together being a single member;
   an output unit at least partially located frontward from the motor and rotatable by the rotor;
   a motor compartment accommodating at least a part of the motor; and
   a grip protruding downward from the motor compartment.

2. The power tool according to claim 1, wherein the shaft includes a protrusion located between the end face of the core and the rotor bearing and protruding radially outward.

3. The power tool according to claim 2, wherein the protrusion surrounds the rotation axis.

4. The power tool according to claim 3, wherein the rotor includes a sensor magnet fixed to the end face of the core with an adhesive.

5. The power tool according to claim 3, wherein the shaft includes
   a front shaft protruding frontward from a front end face of the core, and
   a rear shaft protruding rearward from a rear end face of the core, and
   the rotor bearing includes
   a front rotor bearing supporting the front shaft, and
   a rear rotor bearing supporting the rear shaft.

6. The power tool according to claim 2, wherein the rotor includes a sensor magnet fixed to the end face of the core with an adhesive.

7. The power tool according to claim 6, wherein the shaft includes
   a front shaft protruding frontward from a front end face of the core, and
   a rear shaft protruding rearward from a rear end face of the core, and
   the rotor bearing includes
   a front rotor bearing supporting the front shaft, and
   a rear rotor bearing supporting the rear shaft.

8. The power tool according to claim 2, wherein the shaft includes
   a front shaft protruding frontward from a front end face of the core, and
   a rear shaft protruding rearward from a rear end face of the core, and
   the rotor bearing includes
   a front rotor bearing supporting the front shaft, and
   a rear rotor bearing supporting the rear shaft.

9. The power tool according to claim 1, wherein the shaft includes a protrusion in contact with the rotor bearing.

10. The power tool according to claim 9, wherein the shaft includes
    a front shaft protruding frontward from a front end face of the core, and
    a rear shaft protruding rearward from a rear end face of the core, and
    the rotor bearing includes
    a front rotor bearing supporting the front shaft, and
    a rear rotor bearing supporting the rear shaft.

11. The power tool according to claim 1, wherein the shaft includes
    a front shaft protruding frontward from a front end face of the core, and
    a rear shaft protruding rearward from a rear end face of the core, and
    the rotor bearing includes
    a front rotor bearing supporting the front shaft, and
    a rear rotor bearing supporting the rear shaft.

12. The power tool according to claim 11, wherein the front shaft has a larger outer diameter than the rear shaft.

13. The power tool according to claim 12, further comprising:
    a reducer configured to transmit rotation of the rotor to the output unit; and
    a pinion gear located on a front end of the front shaft and connected to at least a part of the reducer.

14. The power tool according to claim 11, further comprising:
    a reducer configured to transmit rotation of the rotor to the output unit; and
    a pinion gear located on a front end of the front shaft and connected to at least a part of the reducer.

15. The power tool according to claim 14, wherein the front rotor bearing has an inner diameter larger than an outer diameter of the pinion gear.

16. The power tool according to claim 15, wherein the output unit includes a spindle rotatable by rotation of the rotor transmitted by the reducer,
    the power tool further comprises a spindle bearing supporting the spindle, and
    the front rotor bearing and the spindle bearing at least partially overlap each other in the front-rear direction.

17. The power tool according to claim 14, wherein the output unit includes a spindle rotatable by rotation of the rotor transmitted by the reducer,
    the power tool further comprises a spindle bearing supporting the spindle, and
    the front rotor bearing and the spindle bearing at least partially overlap each other in the front-rear direction.

18. The power tool according to claim 17, wherein the spindle bearing includes an inner ring and an outer ring,
    the power tool further comprises a bearing box at least partially surrounding the spindle and holding the spindle bearing,
    the inner ring is fixed to the bearing box, and
    the outer ring is fixed to the spindle.

* * * * *